(12) United States Patent
Crawford et al.

(10) Patent No.: US 11,328,253 B2
(45) Date of Patent: May 10, 2022

(54) SYSTEMS AND METHODS FOR IMPROVED MEETING ENGAGEMENT

(71) Applicant: Educational Measures, LLC, Greenwood Village, CO (US)

(72) Inventors: Marc William Crawford, Greenwood Village, CO (US); Steve James Konieczka, Greenwood Village, CO (US); Tyler Paul Nelson, Greenwood Village, CO (US); Cynthia Kiyoko Bakewell, Greenwood Village, CO (US); Justin Michael Pohlmann, Greenwood Village, CO (US)

(73) Assignee: Educational Measures, LLC, Greenwood Village, CO (US)

( * ) Notice: Subject to any disclaimer, the term of this patent is extended or adjusted under 35 U.S.C. 154(b) by 0 days.

(21) Appl. No.: 16/943,302

(22) Filed: Jul. 30, 2020

(65) Prior Publication Data
US 2020/0380468 A1 Dec. 3, 2020

Related U.S. Application Data

(63) Continuation-in-part of application No. 16/715,551, filed on Dec. 16, 2019.
(Continued)

(51) Int. Cl.
*G06Q 10/00* (2012.01)
*G06Q 10/10* (2012.01)
(Continued)

(52) U.S. Cl.
CPC ......... *G06Q 10/10* (2013.01); *H04L 65/1066* (2013.01); *H04L 67/26* (2013.01)

(58) Field of Classification Search
CPC ...... G06Q 10/10; H04L 65/1066; H04L 67/26
See application file for complete search history.

(56) References Cited

U.S. PATENT DOCUMENTS

| | | | |
|---|---|---|---|
| 8,670,018 B2 * | 3/2014 | Cunnington | G06Q 10/10 348/14.08 |
| 9,843,768 B1 * | 12/2017 | Negi | H04H 60/33 |

(Continued)

OTHER PUBLICATIONS

A. Plaue, Christopher Michael. "Exploring and Visualizing the Impact of Multiple Shared Displays on Collocated Meeting Practices". Georgia Institute of Technology. Aug. 2009.*

(Continued)

*Primary Examiner* — Gabrielle A McCormick
(74) *Attorney, Agent, or Firm* — DLA Piper LLP (US)

(57) ABSTRACT

In some embodiments, the systems and methods built in accordance with the present disclosure may analyze audience engagement with a presentation displayed during a meeting and provide feedback to a presenter during and/or after the presentation. In some embodiments, the provided feedback may include determining metrics indicative of participant engagement levels. Participant engagement levels may then be used to adjust meetings in real-time and/or after the meeting has ended. In some embodiments, the system may include a hybrid configuration where a subset of the presenters, participants and moderators are physically present in the same environment. In some embodiments, the system may include a fully virtual configuration where all of the presenters, participants and moderators are physically remote from each other. A system may include presenter computing devices, participant computing devices and a server system including a data analytics module configured to determine metrics indicative of participant engagement levels.

20 Claims, 13 Drawing Sheets

Related U.S. Application Data

(60) Provisional application No. 62/828,158, filed on Apr. 2, 2019.

(51) Int. Cl.
*H04L 65/1066* (2022.01)
*H04L 67/55* (2022.01)

(56) References Cited

U.S. PATENT DOCUMENTS

| | | | | |
|---|---|---|---|---|
| 9,953,029 | B2* | 4/2018 | Baughman | G06F 40/44 |
| 10,325,291 | B2* | 6/2019 | Ge | G06Q 30/0269 |
| 2008/0320082 | A1* | 12/2008 | Kuhlke | H04L 12/1822 |
| | | | | 709/205 |
| 2009/0070798 | A1* | 3/2009 | Lee | A61B 5/1113 |
| | | | | 725/10 |
| 2009/0241033 | A1* | 9/2009 | Mujtaba | G09B 5/12 |
| | | | | 715/752 |
| 2010/0332959 | A1* | 12/2010 | Mitchell | H04N 21/234336 |
| | | | | 715/202 |
| 2012/0007794 | A1* | 1/2012 | Bansal | H04L 65/1086 |
| | | | | 345/2.1 |
| 2012/0197991 | A1* | 8/2012 | Ramani | G06Q 10/10 |
| | | | | 709/204 |
| 2013/0227420 | A1* | 8/2013 | Pasquero | G06Q 10/10 |
| | | | | 715/730 |
| 2014/0282049 | A1* | 9/2014 | Lyon | G06F 3/0484 |
| | | | | 715/744 |
| 2016/0011729 | A1* | 1/2016 | Flores | G06Q 30/0201 |
| | | | | 715/728 |
| 2016/0049094 | A1* | 2/2016 | Gupta | G09B 9/00 |
| | | | | 434/185 |
| 2016/0063883 | A1* | 3/2016 | Jeyanandarajan | H04L 67/22 |
| | | | | 434/201 |
| 2016/0110669 | A1* | 4/2016 | Iyer | G06Q 10/06315 |
| | | | | 705/7.25 |
| 2017/0127021 | A1* | 5/2017 | Frank | G06K 9/6293 |
| 2017/0295404 | A1* | 10/2017 | Meredith | H04H 60/33 |
| 2018/0007150 | A1* | 1/2018 | Deopura | H04W 4/23 |
| 2018/0124359 | A1* | 5/2018 | Faulkner | H04L 65/403 |
| 2018/0145840 | A1* | 5/2018 | Advani | H04L 67/20 |
| 2018/0343491 | A1* | 11/2018 | Loheide | H04N 21/26241 |
| 2019/0361926 | A1* | 11/2019 | Rogynskyy | G06F 11/3452 |
| 2019/0378164 | A1* | 12/2019 | Eich | H04N 21/4532 |
| 2020/0021453 | A1* | 1/2020 | Advani | H04L 12/1827 |
| 2020/0193264 | A1* | 6/2020 | Zavesky | G06N 20/00 |
| 2020/0210469 | A1* | 7/2020 | Van Rensburg | G06F 40/30 |
| 2020/0313919 | A1* | 10/2020 | Gurr | H04L 12/1831 |

OTHER PUBLICATIONS

Mallonee, Sybil; et al. "Training providers in the use of evidence-based treatments: A comparison of in-person and online delivery modes." Psychology Learning & Teaching 17.1: 61-72. Sage Publications Symposion Publishing the Higher Education Academy Psychology Network (Year: 2018).*

* cited by examiner

SYSTEMS AND METHODS FOR IMPROVED MEETING ENGAGEMENT

CROSS-REFERENCE TO RELATED APPLICATIONS

This application is a continuation in part of U.S. application Ser. No. 16/715,551, filed Dec. 16, 2019, which claims priority to and the benefit of U.S. Provisional Application No. 62/828,158, entitled "SYSTEMS AND METHODS FOR IMPROVED MEETING ENGAGEMENT", filed on Apr. 2, 2019, the contents of which are hereby incorporated by reference in its entirety.

TECHNICAL FIELD

The present disclosure relates to a live meeting platform configured to provide improved meeting engagement.

BACKGROUND

In conventional live meeting environments, a presenter often uses slides to present to an audience. However, the presenters are not always provided with feedback regarding their presentation either (1) during their live presentation, or (2) after the live presentation. Moreover, the presenters are not always able to analyze whether an audience is engaged with the presentation.

Further, conventional systems are limited by their inability to broadcast live presentations or pre-recorded presentations to audiences across a dispersed setting. Still further, conventional systems are limited by their inability to integrate live presentations for later viewing by audience members and incorporate data obtained throughout all of the viewings.

SUMMARY

In some embodiments, the systems and methods built in accordance with the present disclosure analyzes audience engagement with a presentation and may provide feedback to a presenter during and/or after the presentation. In some embodiments, the provided feedback may include determining one or more metrics indicative of participant engagement levels. Participant engagement levels may then be used to adjust live meetings in real-time and/or after the live meeting has ended. In some embodiments, feedback may be provided to an organizer of a meeting (who may be different from a presenter).

In some embodiments, a system may include one or more presenter computing devices configured to display a presentation and generate presentation data, one or more participant computing devices configured to generate participant data including one or more participant reactions to the displayed presentation, and a server system including one or more processors and a memory that includes instructions, that when executed by the one or more processors, causes the one or more processors to: receive participant data from the participant computing device of a live meeting environment, receive presentation data from the presenter computing device of the live meeting environment, determine a key metric for the live meeting environment based on at least one of the received participant data and received presentation data, and modify a presentation of the live meeting environment based on at least one determined key metric.

In some embodiments, a method includes receiving, at a server system, participant data from a participant computing device of a live meeting environment, receiving, at a server system, presentation data from a presenter computing device of the live meeting environment, determining one or more key metrics for the live meeting environment based on the received participant data and received presentation data, and modifying a presentation for the live meeting environment based on the determined one or more key metrics.

In some embodiments, a system may include a presenter computing device configured to display a presentation and generate presentation data, a participant computing device configured to generate participant data comprising one or more participant reactions to the displayed presentation, and a server system comprising one or more processors and a memory that includes instructions, that when executed by the one or more processors, causes the one or more processors to: receive participant data from the participant computing device of a live meeting environment; receive presentation data from the presenter computing device of the live meeting environment; determine a key metric for the live meeting environment based on at least one of the received participant data and received presentation data; and modify a presentation of the live meeting environment based at least one the determined key metric. Optionally, the participant data may include at least one of participant engagement data, and participant feedback. Optionally, the presentation data may include at least one of slides associated with the presentation, timing information for when each slide is pushed to a participant computing device, and polling questions. Optionally, key metrics may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. Optionally, a participant profile includes at least one of a participant demographic, an indication of the content a participant responded to, or the percentage of questions the participant answered correctly. Optionally, modifications to the presentation of the live meeting environment comprises altering at least one of slide formatting, slide order, slide content, presentation order, and presentation content.

In some embodiments, a method includes the steps of receiving, at a server system, participant data from a participant computing device of a live meeting environment, receiving, at a server system, presentation data from a presenter computing device of the live meeting environment, determining one or more key metrics for the live meeting environment based on the received participant data and received presentation data, and modifying a presentation for the live meeting environment based on the determined one or more key metrics. Optionally, participant data may include at least one of participant engagement data, and participant feedback. Optionally, the presentation data may include at least one of slides associated with the presentation, timing information for when each slide is pushed to a participant computing device, and polling questions. The key metric may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. The participant profile may include at least one of a participant demographic, an indication of the content a participant responded to, or the percentage of questions the participant answered correctly. Optionally, modifying the presentation of the live meeting environment may include altering at least one of slide formatting, slide order, slide content, presentation order, and presentation content. Determining one or more key metrics for the live meeting environment may include determining one or more key metrics for a particular slide, determining one or more key metrics across a collection of slides, and comparing at least one of the determined key metrics for a particular slide, and key metrics for across a collection of slides, with a benchmark.

Embodiments of the present disclosure may include a computer program product for improving live meeting engagement. The computer program product may include computer-readable media having computer-readable code for effecting actions in a computing platform such as program code for receiving participant data from a participant computing device of a live meeting environment, program code for receiving presentation data from a presenter computing device of the live meeting environment, program code for determining a key metric for the live meeting environment based on at least one of the received participant data and the received presentation data, and program code for modifying a presentation of the live meeting environment based on at least one determined key metric.

In such an embodiment, the participant data may include at least one of participant engagement data, and participant feedback. Optionally, the presentation data may include at least one of slides associated with the presentation, timing information for when each slide is pushed to a participant computing device, and polling questions. Additionally, the key metric may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. Optionally, the participant profile may include at least one of a participant demographic, an indication of the content a participant responded to, or the percentage of questions the participant answered correctly. Further, the program code may also include instructions for modifying the presentation of the live meeting environment by altering at least one of slide formatting, slide order, slide content, presentation order, and presentation content. Additionally, the program code may determine one or more key metrics for the live meeting environment by determining one or more key metrics for a particular slide, determining one or more key metrics across a collection of slides, and comparing at least one of the determined key metrics for a particular slide, and key metrics for across a collection of slides, with a benchmark.

In some embodiments, a system includes a presenter computing device configured to generate a presentation for a meeting environment, a participant computing device configured to display the presentation and generate participant data comprising one or more participant reactions to the displayed presentation, and a server system comprising one or more processors and a memory that includes instructions. When the instructions executed by the one or more processors, it causes the one or more processors to receive a presentation for a meeting environment and presentation data from the presenter computing device or a moderator computing device, display on a participant computing device the received presentation, receive participant data from the participant computing device, determine, by a data analytics module of the server system, a key metric for the meeting environment based on at least one of the received participant data and received presentation data, and modify a presentation of the meeting environment based on the determined key metric.

Optionally, the participant data includes at least one of participant engagement data, participant feedback, and participant login timing data. Optionally, the presentation data includes at least one of slides associated with the presentation, timing information for when each slide is displayed to a participant, polling questions, chat data, audio transcripts from the presentation, and video transcripts from the presentation. The key metric may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. The participant profile may include at least one of a participant demographic, an indication of the content a participant responded to, the percentage of questions the participant answered correctly, or a unique participant link. Modifications to the presentation may include altering at least one of slide formatting, slide order, slide content, presentation order, and presentation content. The server system may be configured to integrate with a videoconferencing software to provide a user interface on one of the participant computing device, presenter computing device and moderator computing device to display the presentation, and engage with the presentation. The system may also include a private network configured to communicatively interface at least one of the participant computing device, moderator computing device, and the presenter computing device. Further, the moderator computing device may be configured to receive participant inquiries from a participant computing device, determine and provide a subset of the participant inquiries for presenter input, receive presenter input on the subset of participant inquiries, and provide the presenter input to the participant computing device for display. In some embodiments, at least a portion of the participant computing devices, presenter computing devices and moderator computing devices are located in physical proximity. In some embodiments, at least a portion of the participant computing devices, presenter computing devices and moderator computing devices are remote from each other.

A method built in accordance with embodiments of the present disclosure may include the steps of receiving, at a server system, participant data from a participant computing device of a meeting environment, receiving, at a server system, presentation data from at least one of a presenter computing device or a moderator computing device of the meeting environment, determining one or more key metrics for the meeting environment based on the received participant data and received presentation data, and modifying a presentation for the meeting environment based on the determined one or more key metrics. Optionally, participant data may include at least one of participant engagement data, participant feedback, and participant login timing data. Optionally, the presentation data comprises at least one of slides associated with the presentation, timing information for when each slide is displayed to a participant, polling questions, chat data, audio transcripts from the presentation, and video transcripts from the presentation. Key metrics may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. The participant profile may include at least one of a participant demographic, an indication of the content a participant responded to, or the percentage of questions the participant answered correctly, or a unique participant link. Optionally, modifying the presentation of the meeting environment may include altering at least one of slide formatting, slide order, slide content, presentation order, and presentation content. Determining one or more key metrics for the meeting environment may include determining one or more key metrics for a particular slide, determining one or more key metrics across a collection of slides, and comparing at least one of the determined key metrics for a particular slide, and key metrics for across a collection of slides, with a benchmark. The method may include receiving participant inquiries from a participant computing device, determining and providing a subset of the participant inquiries for presenter input, receiving presenter input on the subset of participant inquiries, and providing the presenter input to the participant computing device for display. In some embodiments, at least one of the participant computing device, moderator computing device, and the presenter computing device may be communicatively coupled over a private network.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In some embodiments, the systems and methods built in accordance with the present disclosure may analyze audience engagement with a presentation displayed during a live meeting and may provide feedback to a presenter during and/or after the presentation. In some embodiments, the provided feedback may include determining one or more metrics indicative of participant engagement levels. Participant engagement levels may then be used to adjust live meetings in real-time and/or after the live meeting has ended.

In some embodiments, a live meeting environment may include a conference, a workshop, a business meeting, an academic setting, and the like. In some embodiments, the live meeting environment may include conferences for various industries, including, but not limited to, the financial services, pharmaceutical, educational industries and the like.

A participant may refer to an individual viewing a presentation. Examples may include conference participants, students and the like. A presenter may refer to the one or more individuals providing the presentation and/or moderating the live meeting.

Figure 1:
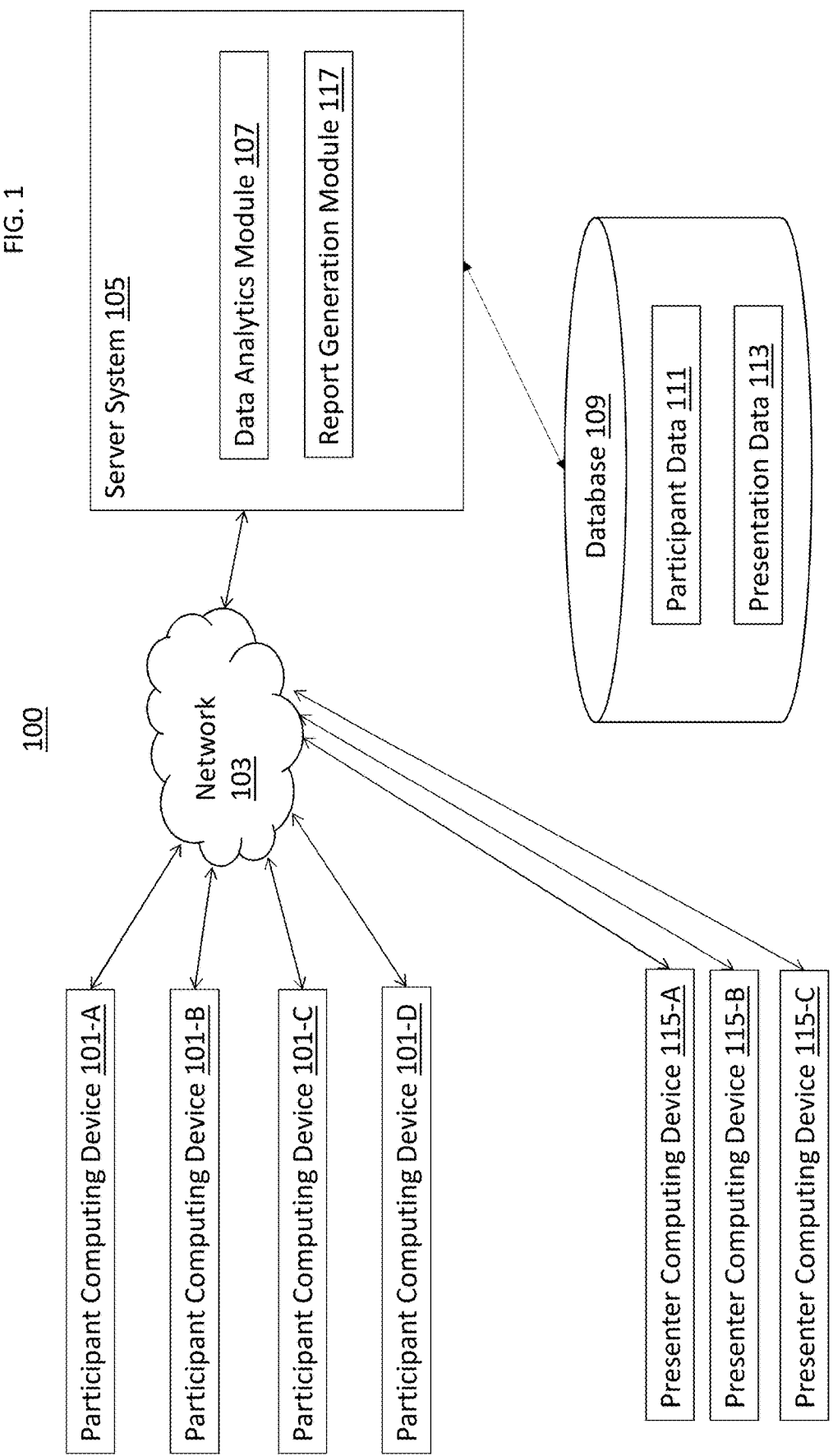
FIG. 1 illustrates a system for improved meeting engagement in accordance with some embodiments of the present disclosure.

FIG. 1 illustrates a system 100 for improved meeting engagement in accordance with an aspect of the present disclosure. A system may include one or more participant computing devices 101-A, 101-B, etc., collectively, 101, communicatively coupled to a network 103. The network 103 may also be communicatively coupled to one or more presenter computing device 115-A, 115-B, etc., collectively, 115. The network 103 may also be communicatively coupled to a server system 105 configured to include a data analytics module 107 and a report generation module 117. Further, the server system 105 may be communicatively coupled to a database 109 configured to store participant data 111 and presentation data 113.

Network 103 may include a full-service, private network configured to communicate with participant computing devices 101, presenter computing devices 115, and the server system 105. In some embodiments, network 103 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

In some embodiments, the participant computing devices 101 may include a desktop, laptop, cell phone, smartphone, tablet, and the like. In some embodiments, a participant may use one of the participant computing devices 101 to access a webpage, portal, form, or other application generated by the server system 105 via a user interface on the computing device 101. The user interface may be configured to display a presentation and/or related materials for the presentation to the participant. The user interface on the participant computing device 101 may be configured to receive input from a user. Example inputs include notes, saved slides, rankings, polling information, comments on the displayed slides, answers to queries presented on the user interface, and the like.

In some embodiments, the server system 105 may push one or more slides to participant devices 101 based on a command received from a presenter computing device 115. For example, the presenter may initiate a command from the presenter computing device 115, for the presentation displayed on the participant computing device 101 to move to the next slide.

Using the participant computing devices 101, a user may type in notes, save comments on a slide, navigate through a presentation, answer a question presented to the user, and/or rate a slide. This may form at least a portion of the participant data.

The presentation data may include slides associated with the presentation, timing information for when each slide is pushed to a participant computing device, polling questions, and the like.

In some embodiments, a platform built in accordance with the present disclosure may allow users to manage live meetings, engage participants across meeting types, and analyze the impact of live meetings in a single platform. In some embodiments, the participant computing device 101 may be provided by the participant in a "bring your own device" model (e.g., participant provided personal smartphone or laptop). Alternatively, or additionally, in some embodiments, the participant computing device 101 may be provided by a meeting organizer (e.g., pre-designated laptops, tablets, and the like).

In some embodiments, the server system 105 may configure an online platform that can be accessed by the participant computing device 101 and/or presenter computing device 115. In some embodiments, the online platform may be developed from a Software As A Service Application (SaaS). In some embodiments, an online platform may be configured to create and configure new live meetings, manage blocks of live meetings, upload presentations and documents to be shared during live meetings, customize live meeting experiences, review engagement meetings, run and/or moderate meetings, and synchronize participant data and presentation data.

In some embodiments, the server system 105 may receive presentation data from the presenter computing device 115. The presenter computing device 115 may generate presentation data including a time-stamp for the display of each slide within a presentation. The presentation data 113 may then be stored on a database 109 by the server system 105. The presentation data 113 may include the content displayed to participants along with a time stamp of events. For example, the presentation data 113 may include a timestamp data indicating the time at which each slide of a presentation was displayed. In some embodiments, the database 109 may store an aggregation of data from various live meetings. Live meetings may be grouped based on content, presenter, participant, and the like.

Further, in some embodiments data including participant data 111 and presentation data 113 may be stored in the database 109 in a manner capable of fast storage and retrieval. For example, only segments of participant data 111 and presentation data 113 may be stored into a reader friendly database structure that is denormalized. Additionally, the database may be configured for the fast filtering of items.

A participant computing device 101 may be configured to generate participant data for the live meeting environment. For example, in some embodiments, the participant data may include engagement data reflective of user interactions with a presentation. Engagement data may include data indicative of user clicks (e.g., total clicks, when clicked), user notes (e.g., length of notes, timing of notes), slides saved or favorited, questions asked of presenters/panels, user responses to surveys, and the like.

Participant data may also include participant feedback provided using Pre-/Post-Presentation surveys, polling questions, participant questions and participant notes. Participant data may include responses to polling questions including single, multi-select, priority-ranking, ratings, and open-response questions. The data may also include responses to survey questions indicative of participant demographics, knowledge/confidence level, experience, and feedback.

Participant engagement may be determined from participant questions and participant notes.

The participant data may be collected through the user of an application run on the participant user computing device 101. The participant data may then be transmitted to the server system 105 for storage on database 109.

Upon receipt of the participant data from the participant computing device 101 and the presentation data from the presenter computing device 115, the data analytics module 107 of the server system 105 may be configured to determine one or more key metrics for the live meeting environment based on the received participant data and/or presentation data.

In some embodiments, key metrics may indicate participant engagement levels, participant engagement level over time, how participants rate meetings, popularity of additional content, and key words. In some embodiments, the disclosed systems may involve determining engagement metrics on a slide-by-slide basis. In some embodiments, the disclosed systems may include pre- and post-intervals for all questions which enable organizers to measure shifts in learning and behavior throughout the course of their meeting. Further, the data analytics module 107 may be configured to perform statistical distributions and generate visualizations of the computed statistical distributions and the like that may then be integrated into a report by the report generation module 117.

In some embodiments, key metrics may include a total count of participants, top participants based on engagement actions, percentage of participants who engaged with a content based on their actions (e.g., saving a slide, responding to polling questions, etc.), percentage of highly engaged participants (e.g., participants who took text notes, stylus notes, submitted questions), total number of actions, actions by action types, response rates to polling questions, response rates to survey questions, percentage of correction questions, experience ratings, counts of actions over time, word cloud, engagement levels by slide, response graphs by questions, participant identification, participant profiles, and the like. In some embodiments, a participant profile may indicate what content a participant responded to, how they responded, the percentage of questions they answered correctly, and the like.

In some embodiments, determining key metrics may include mapping correlations between engagement and knowledge, demographic profiling, sentiment analysis, and benchmarking.

In some embodiments, the determined key metrics may include the percentage of participants deemed to be engaged and the percentage of participants deemed to be highly engage. The types, level, and timing of engagement data can be used to categorize participants into segments (e.g., engaged or highly engaged segments) to help group data for reporting and filtering. In some embodiments, segments may overlap. For instance, participants categorized as "Engaged" may include those found "Highly Engaged". In some embodiments, an "Engaged" participant may be a participant that at a minimum, engaged with the presentation by performing a single click. In some embodiments, a "Highly Engaged Participant" may be a participant that at a minimum, interacted with the presentation by doing more than a single click (e.g., typing a presenter question or note). In some embodiments a metric for "Engaged Percentage" may be generated by determining the number of participants that minimally interacted with the presentation by way of a single click (e.g., a single click may correspond with saving a slide) and divided by the total participants that are logged into the computing devices. Additionally, a metric for a "highly engaged percentage" may be generated by determining the number of participants that more than minimally interacted with the presentation and dividing by the total participants that logged into the devices. For example, this may include determining the number of participants that made a text note, a stylus note, a rating, a submitted presenter question, a response to survey or polling questions or an interaction with a custom button content, or the like.

Alternatively, "Engaged" and "Highly Engaged" participants may be determined by the timing of their responses/actions. For example, in some embodiments, a Highly Engaged participant may be defined as one that took actions every 5 minutes or was in the top 10% based on total number of actions. In another example, highly engaged participants may be defined as Or combinations such as answered at least 70% of survey questions and submitted a question. Based on the definitions, a calculation can be applied either in the database or in a BI Tool that can then be used for grouping and filtering data.

After categorizing participants, benchmarks can be applied to all the data by calculating average engaged percentage or average highly engaged percentage. The average percentages can be calculated based on the entire data set or subsets (client, series, type of meeting, location, etc.) thus creating benchmarks.

For example, in some embodiments the data analytics module 107 may be used to correlate and observe relationships between meeting settings and engagement, knowledge attained by participants, and the participant reported experience. The observations may then be used to generate predictive models that may suggest an ideal meeting structure. For example, key metrics may reveal that the ideal meeting design for a symposium in a particular geographical region (e.g., Eastern Europe) may have a structure that is 4 to 5 hours in total length, allows participants to view all slides (i.e., traverse forwards and backwards through a slide deck), has more frequent question and answer sessions, conducts a pre-test survey prior to the start of the meeting, leads to a higher level of participant engagement, and in turn higher knowledge transfer.

The data analytics module 107 may perform statistical analysis to determine correlative variables. Examples of statistical techniques performed by the data analytics module 107 include, but are not limited to, Chi-square automatic interaction detection (CHAID), co-variance, unsupervised clustering, Classification and Regression Tree (CART), and the like. In some embodiments, the data analytics module 107 may perform statistical techniques iteratively until a correlation between variables is determined. Data analytics module 107 may interface with statistical software tools (e.g. R, Konstanz Information Miner (KNIME)).

Demographic profiling (e.g., identifying data surrounding a participant's demographics) may be correlated with knowledge and engagement data to determine and identify any gaps in learning for a target audience. For example, knowledge and engagement data can be analyzed against a demographic (e.g., physician assistants). For example, a group of physician assistants correlated with high engagement may have met all of the learning objectives, while a second group of physician assistants that showed average engagement may have met only one learning objective. Accordingly, the modification of the presentation may include modifying the presentation to include more time such that participants may ask more questions, be more highly engaged, and thus show improved learning.

In some embodiments, the data analytics module 107 may be configured to calculate benchmarks, or engagement and experience scores across clients, meeting types, therapeutic areas, protocols, presenters, and the like. In this manner, if a particular presentation and/or meeting format continuously has lower engagement and experience scores a survey response may indicate that the presenters may not have adequate time to go through all of their content and hold a question and answer session. Accordingly, the presentation or meeting format may be modified to allow more time to the presenters along with a dedicated question and answer session in order to improve engagement along with the experience for the participants and to also improve their learning objectives scores.

In some embodiments, benchmarks may be determined for any metric by averaging the data over the entire data set or a subset thereof. For example, for a particular presentation, the average number of saved slides may be determined across each participant. A client saved slide benchmark may be determined by aggregating the quantity of saved slides for all meetings for that client and dividing by the total participants for those meetings. In some embodiments, the performance as measured by saved slides of a single meeting can be used to compare a particular meeting to the client benchmark in order to understand whether the meeting performed higher (better) or lower (worse) than benchmark. Benchmark data may be stored in a database. In some embodiments, the benchmark data may be generated and used to update previously stored benchmark data in the database. For example, data may be extracted to determine benchmarks and update the stored benchmark information at predetermined time spans (e.g. monthly, quarterly, after a specified number of meetings, etc.). Alternatively, benchmark data may be generated in real time.

In some embodiments, the server system may include a report generation module 117 further configured to modify a presentation of the live meeting environment based on the key metrics and/or provide reports to a presenter and/or organizer for the live meeting.

In some embodiments, a report may include documents that and/or raw data downloads that may be provided to a presenter and/or organizer. The report may provide a summary of engagement data. Reports may include visualizations of the slides and/or presentations a participant interacts with, key metrics, a timeline of engagement. The report may be automatically generated and presented in a downloadable format.

Reports may be provided as a part of an online platform that allows organizers and/or presenters to filter and sort presentations and their corresponding participant feedback. For example, in some embodiments the online platform may allow for the filtering and sorting of presentations by different aspects (e.g., slides with most questions, slides with most notes, slides least engaging). Reports may also indicate when participants were most engaged, which participants were most engaged, how participants rated meetings, which content was most popular and the key words of questions asked.

Reports may provide advanced analytic capabilities to an organizer, and allow for the filtering, combining, sorting, and segregation of data. Further, the reports may allow for the cross comparison across presentation and participant data from across various live meetings. Reports may include visualizations, screenshots, sortable and/or filterable metrics, a timeline of engagement statistics, and the like.

Figure 2:
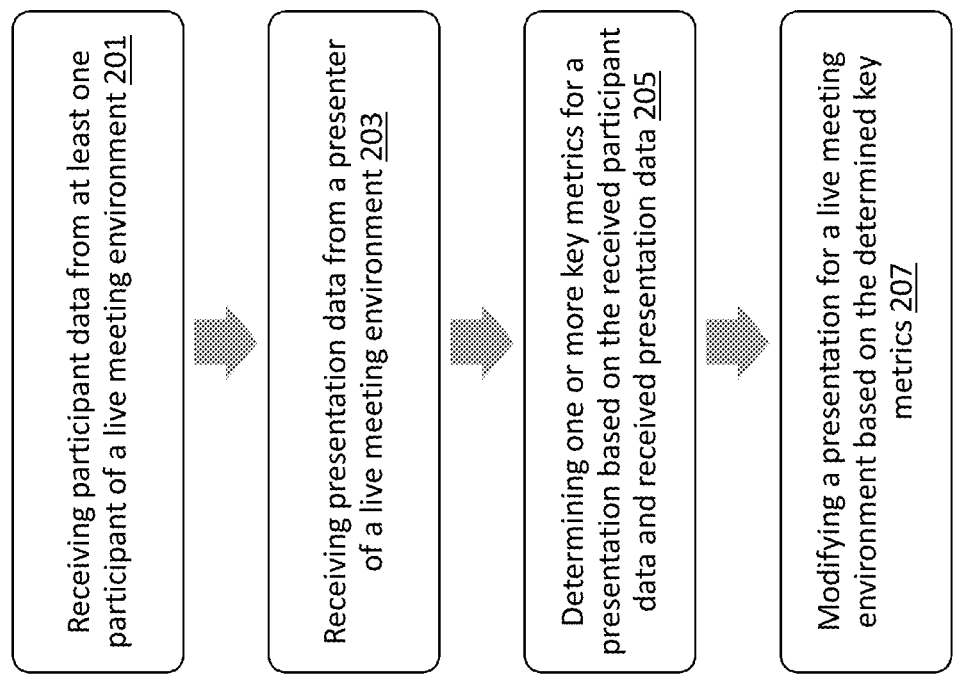
FIG. 2 illustrates a method for improved meeting engagement in accordance with some embodiments of the present disclosure.

FIG. 2 illustrates a method for improved meeting engagement in accordance with an aspect of the present disclosure. A method may include the steps of receiving participant data from at least one participant of a live meeting environment 201, receiving presentation data from a presenter of a live meeting environment 203, determining one or more key metrics for a presentation based on the received participant data and received presentation data 205, and modifying a presentation for a live meeting environment based on the determined key metrics 207.

Figure 3:
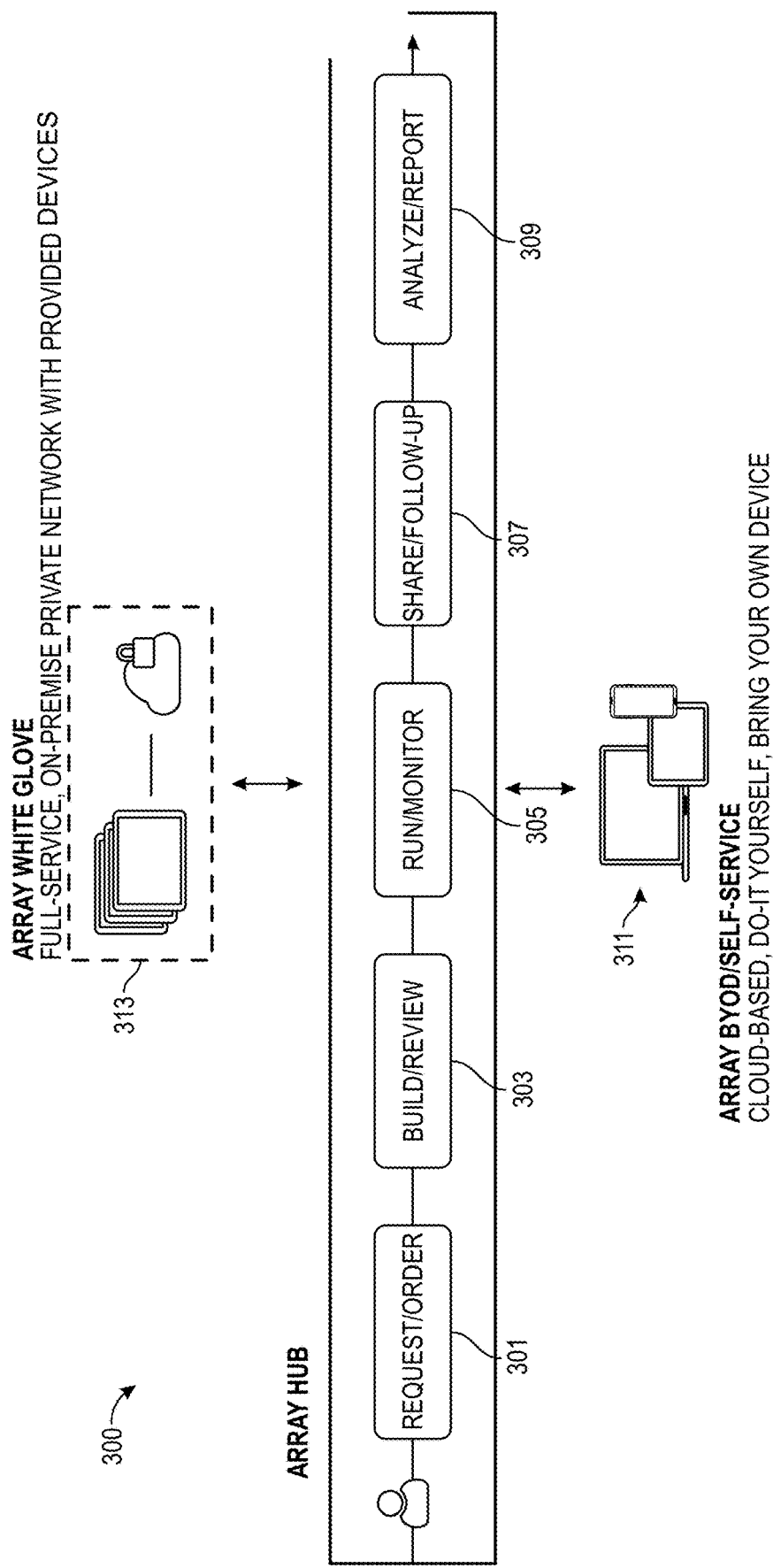
FIG. 3 illustrates a schematic diagram for a platform built in accordance with the system illustrated in FIG. 1.

FIG. 3 illustrates a schematic diagram for a platform built in accordance with the system illustrated in FIG. 1. The platform may be used by a meeting organizer to create high-engagement meeting experiences. The platform may be embodied in a SaaS environment. The platform may be configured to allow the creation and configuration of new meetings, management of blocks of meetings, uploading of presentations and documents that are to be shared during meetings, communicating with participants of the meetings, creating post-meeting content and the like.

In particular, FIG. 3 illustrates a platform 300 configured to build a live meeting environment and provide a meeting planning lifecycle via an online platform. As illustrated in FIG. 3, the platform 300 may include a request/order stage 301, a build/review stage 303, a run/monitor stage 305, a share/follow-up stage 307, and an analyze/report stage 309.

During the request/order stage 301 an organizer may request meetings, and define engagement objectives. For example, a user may request a full-service meeting that is organized by the platform 300. Alternatively, the user may request a block of meetings organized by the platform 300. In some embodiments, the platform 300 may be integrated into a Customer Relationship Management (CRM) system. Accordingly, in such an embodiment, the request/order may be automatically processed, and the appropriate stakeholders can be notified appropriately.

In the build/review stage 303 an organizer may upload assets/slides, chat and/or message with participants and/or presenters, review and edit content of slides, and the like. Uploaded documents may also include slide presentations, resource documents, survey questions, and the like. Further, during the build/review stage 303, an organizer may be able to communicate with a service provider associated with the platform 300 to streamline communication.

In the run/monitor stage 305 an organizer may download and/or synchronize a presentation to a server system and monitor live meeting metrics. During the run/monitor stage 305 the platform 300 may be configured to process and/or store the presentation data and the participant data in the relevant database.

For example, in some embodiments, an organizer may monitor the number of participants logged in, the number of live connections, counts of all the engagement metrics (number of slides saved, presenter questions, etc.), responses to polls the participants are submitting, the time spent on a slide, time since the last engagement action, the number of slides left in deck, and the like in real time. These monitored factors may also be monitored offline, or data for the monitored factors may be stored and retrieved while offline.

In the share/follow-up stage 307 an organizer may email participant notes and resources, send certificates and follow-up surveys. This may include the generation of automated emails to participants. In some embodiments, the emails may include participant notes and saved content from the meeting as well as targeted communication based on how participants engaged within the meeting. In the analyze/report stage 309 an organizer may provide data analytics and trends. In some embodiments, these may include the reports discussed above.

As illustrated in FIG. 3, in some embodiments, the system may be configured such that participants may bring their own device and access a cloud based server system 311. In other embodiments, a full-service on-premise private network may be provided with computing devices 313.

Figure 4:
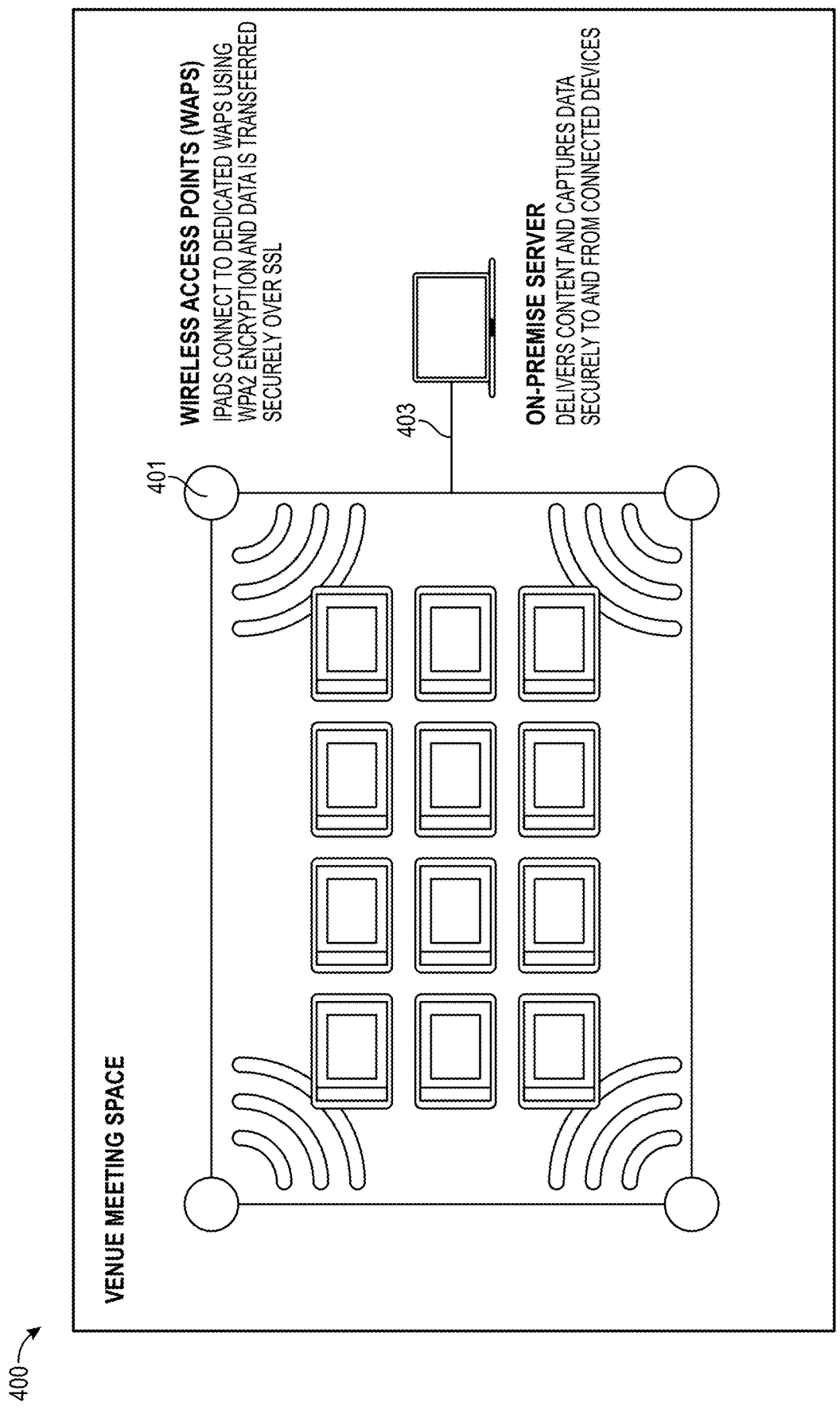
FIG. 4 illustrates a private network in accordance with some embodiments of the present disclosure.

FIG. 4 illustrates an example of a private network setup in accordance with an embodiment of the present disclosure. The private network 400 may include wireless access points 401 distributed throughout a venue meeting space and an on premise server 403. The use of a private network 400 may allow more reliable connections for the participant computing device and secure transfer of presentation and participant data.

FIGS. 5A-5D illustrate examples of reports generated by a platform in accordance with an aspect of the present disclosure.

Figure 5A:
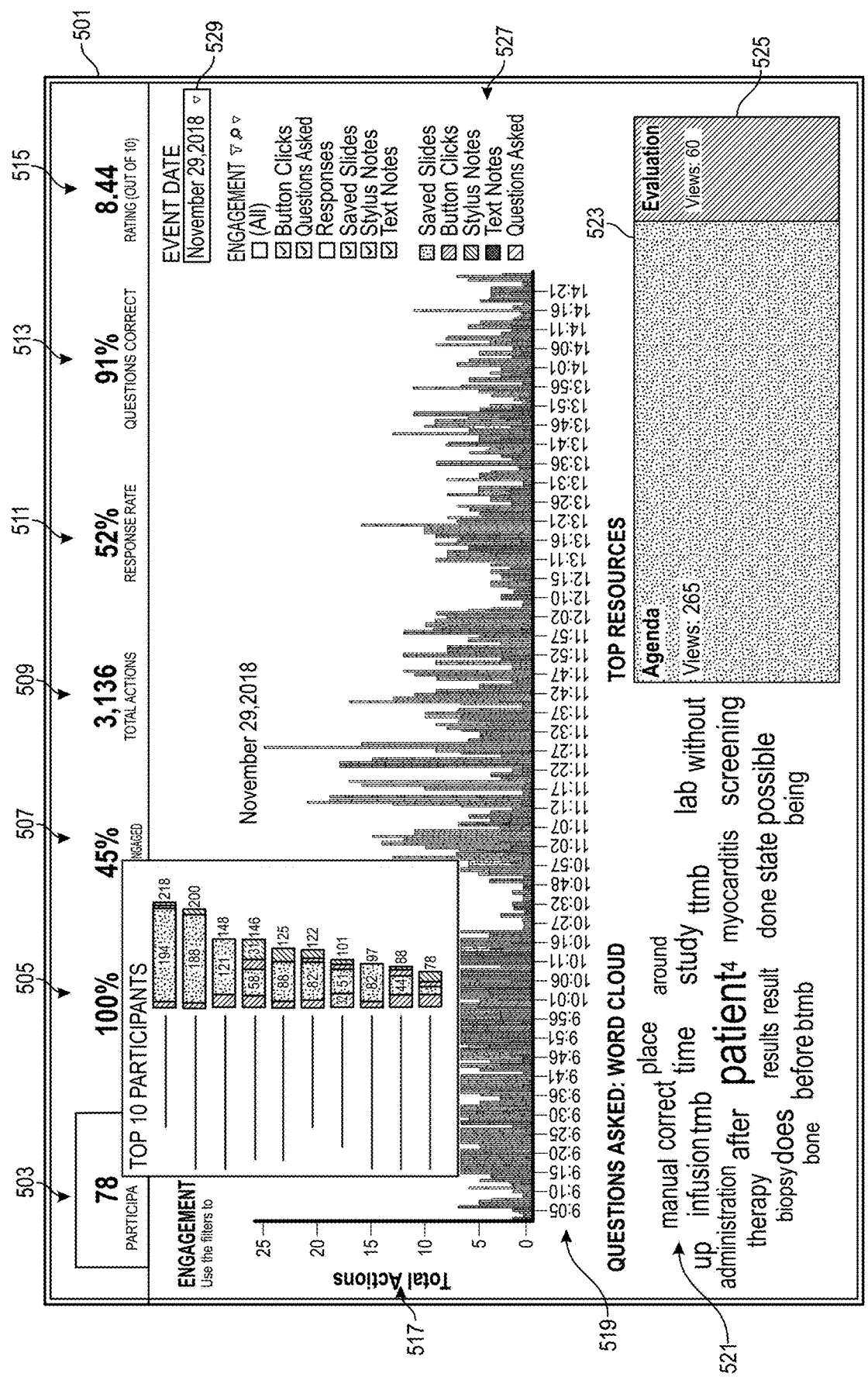
FIG. 5A illustrates a view of a platform built in accordance with some embodiments of the present disclosure.

In particular, FIG. 5A illustrates a report 501 associated with a live meeting presentation including a list of top participants 503, response rates 511, questions correct 513, ratings for a presentation 515, a word cloud including key words from questions asked 521, and the like. As illustrated, each metric may be tied to the time a slide transitioned in the presentation (e.g., actions 517 over time-stamps 519). Engagement metrics 529 may also be displayed and may include button clicks, questions asked, responses, saved slides, stylus notes, text notes, and the like. For example, displayed engagement metrics 529 may include the engaged percentage 505, highly engaged percentage 507, total actions 509, button clicks—agenda 523, button clicks—views 525, a legend for an engagement timeline graph 527, and the like.

For example, as described above, the engaged percentage 505 may be generated by determining the number of participants that minimally interacted with the presentation by way of a single click (e.g., a single click may correspond with saving a slide) and divided by the total participants that are logged into the computing devices. Additionally, a metric for a highly engaged percentage 507 may be generated by determining the number of participants that more than minimally interacted with the presentation and dividing by the total participants that logged into the devices.

The total actions 509 may be indicative of all of the engagement actions for a meeting. Engagement metrics 529 may also display a response rate, which may be indicative of the total unique number of responses to each question, total questions asked, and/or total participants to the meeting. The ratings may also be displayed. In some embodiments, the ratings may be the sum of the total number of responses to an answer choice weighted by the scale for each answer choice, normalized on a 1-10 scale.

Figure 5B:
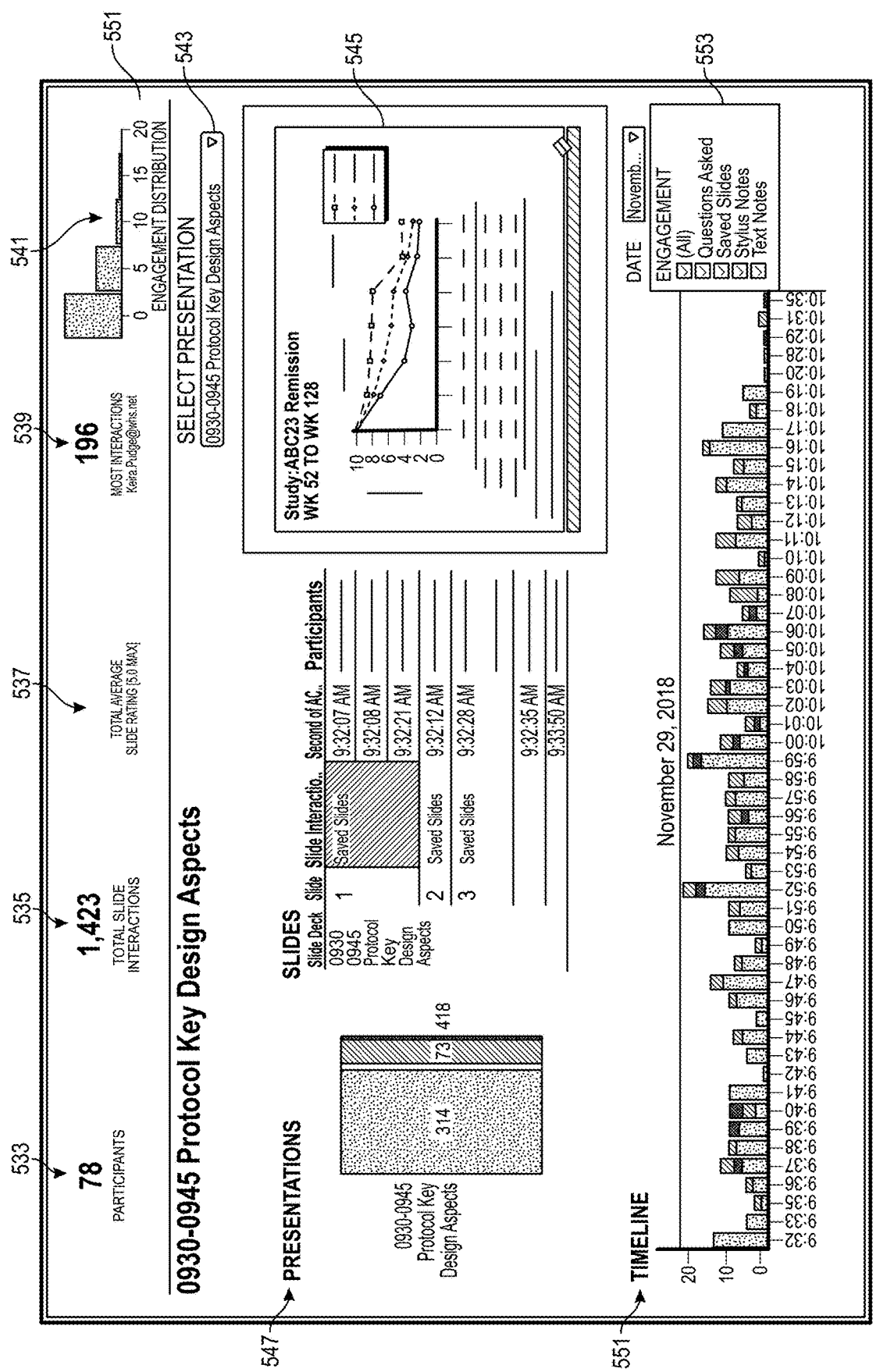
FIG. 5B illustrates a view of a platform built in accordance with some embodiments of the present disclosure.

FIG. 5B illustrates a report 551 associated with a live meeting including a list of slides most saved or engaged with. As illustrated, the report may provide a protocol of key design aspects for the presentation selected 543 including, for example, the slide 545, when it was displayed, and which participants saved the displayed slide 547. Further, engagement 553 with the same presentation over time is illustrated in the timeline 551. The report 551 may also display the number of participants 533, the total slide interactions 535, the total average slide rating 537, the participant with the most interactions with the presentation 539, and a distribution of the engagement 541.

Figure 5C:
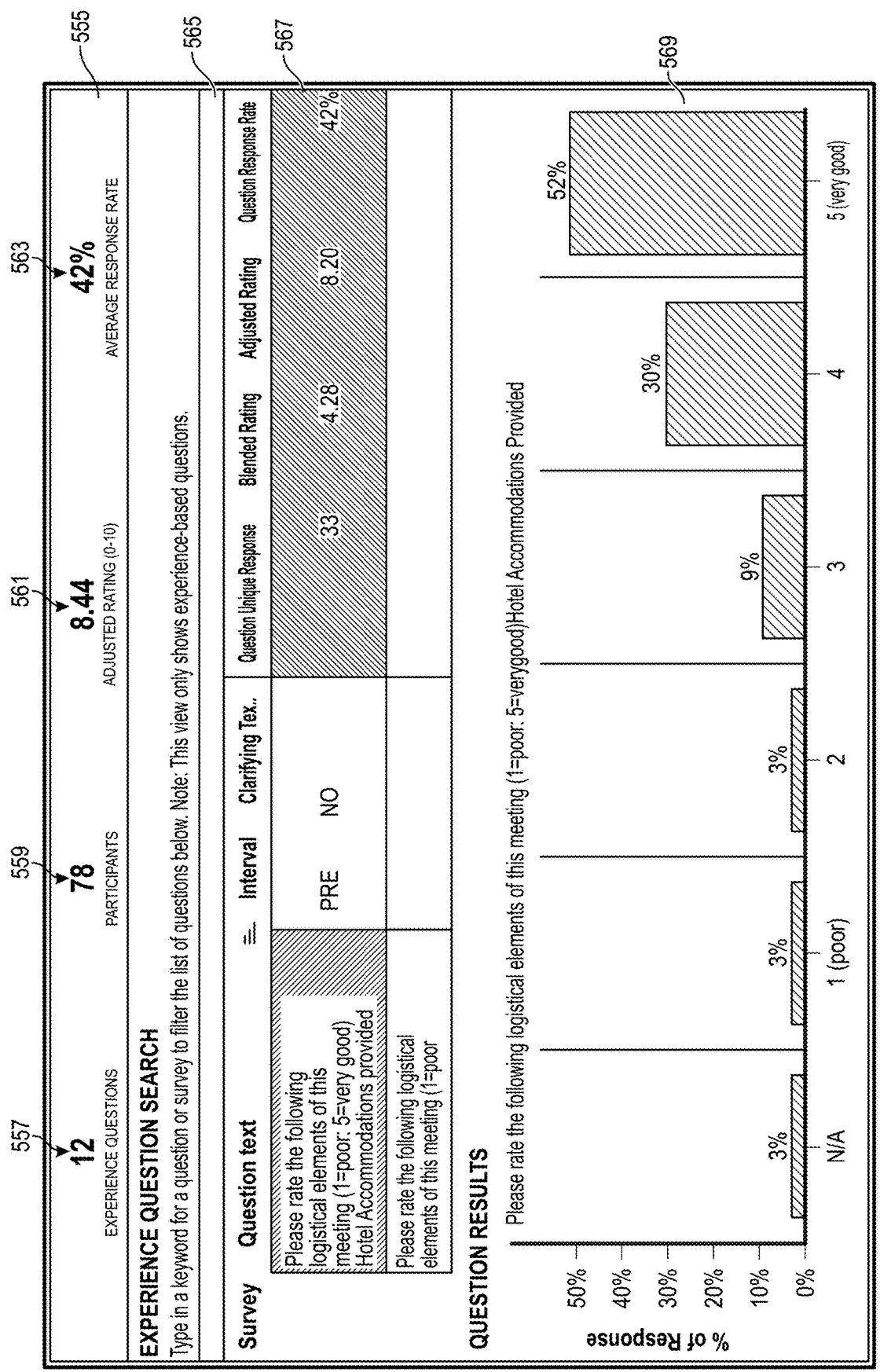
FIG. 5C illustrates a view of a platform built in accordance with some embodiments of the present disclosure.

FIG. 5C illustrates a report 555 that shows feedback and participant experience, including for example, ratings 567 provided by participants. For example, a user may rate 569 logistical elements of a meeting including hotel accommodations, transportation and the like. Further, the report may allow a user to filter a list of questions to search for an experience 565. The report 555 may include experience questions 557, participants 559, an adjusted rating 561, and an average response rate 563.

Figure 5D:
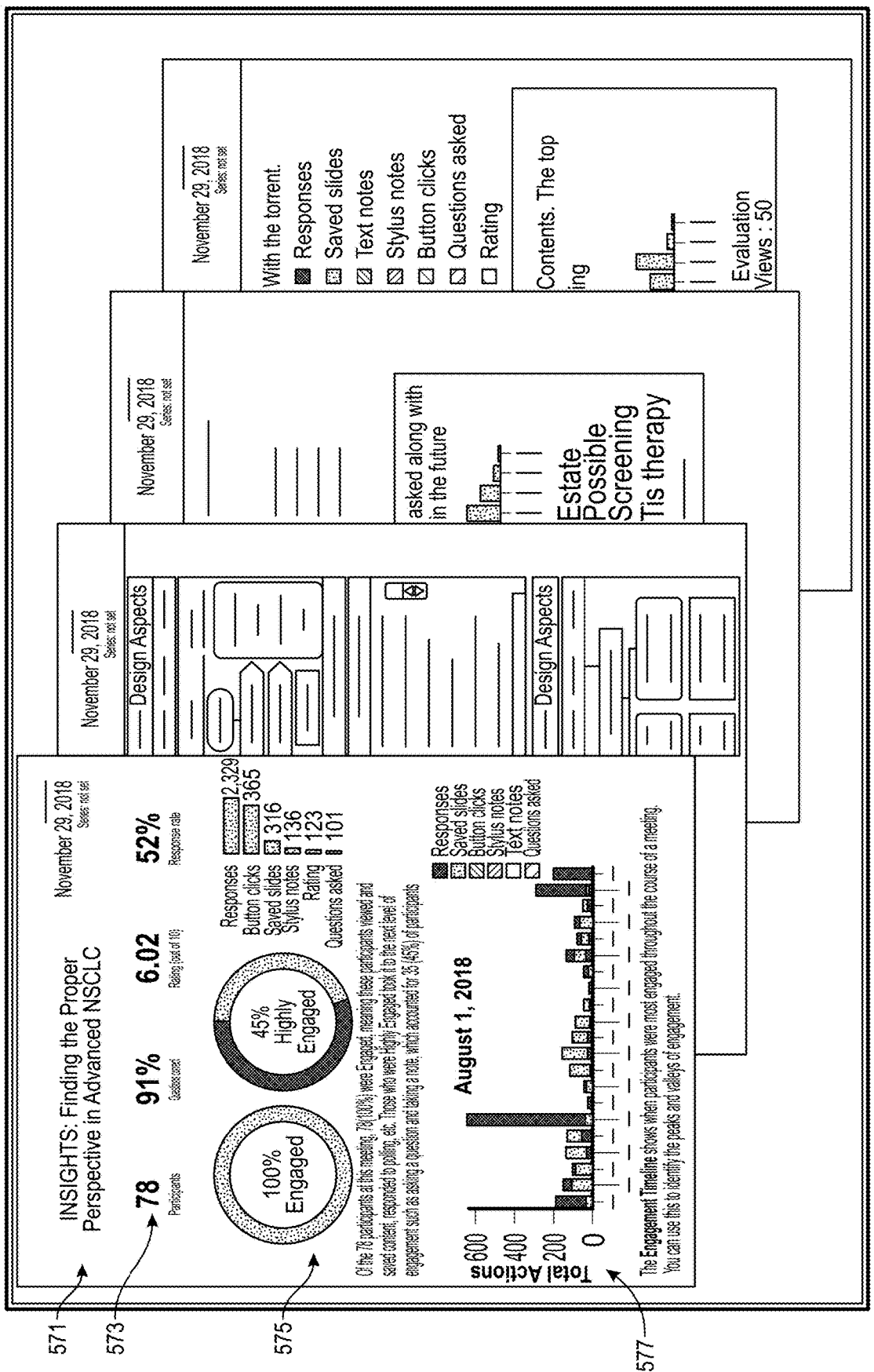
FIG. 5D illustrates a view of a platform built in accordance with some embodiments of the present disclosure.

FIG. 5D illustrates a report 571 that may be provided or organizers or other stakeholders that provides a summary 573 of engagement activity with live meetings.

Examples of data that may be displayed towards a user may include an overall meeting summary including a graphical indication of engagement levels 575. For example, the summary may display the what percentage of the participants were engaged, or highly engaged. Further, in some embodiments, the reports may include demographic characteristics (e.g., number of participants from each of cardiology, endocrinology, emergency physicians, hematology, family medicine and gastroenterology). Demographic characteristics in a medical meeting may also include a breakdown in specialty, average years of practice, and average number of patients seen per week. Further, demographic characteristics may also include geographic information, such as the region each participant is located in.

Reports may also include a summary of knowledge shift by learning objectives. In other words, survey responses and polling data may be used to determine whether a participant gained knowledge from the presentation and correlated to their engagement during the presentation.

Reports may also include a net meeting score. The net meeting score may be an indicator of the overall success of the meeting based on the participant experience (how the meeting was perceived), knowledge (how much knowledge was transferred as determined by pre-/post-results of the participants) and engagement (based on percentage of people who are highly engaged/not engaged).

For example, in some embodiments, the net meeting score may be an aggregation of individual scores for experience, knowledge and engagement at a meeting level and provide as single data point that reflects the quality of the meeting/presentation. Using a single data point may allow for an easier comparison of data across meetings.

In another example, in some embodiments, the experience score may be determined based on the Net Promotor Score™ (NPS). The Net Promotor Score (−100 to 100) is determined based on asking a specific question and collecting data on a 0-10 scale. Experience score can also be calculated based on other rating scales (1-5 or 1-6) and a different calculation can be applied such as number of rating that are 5's and 6's minus number of ratings that are 1's and 2's.

In some embodiments, the knowledge score may be determined based on categorizing participants as "unaffected", "reinforced", or "improved" for each question asked that has a correct answer. In some embodiments, participants may be asked questions pre- and post-presentation. Accordingly, the knowledge score may be determined by adding the percentage of improved and reinforced and subtracting the percentage unaffected, thus creating a score between −100 and 100. In some embodiments, an unaffected score may correspond to a wrong answer to a question pre- and post-presentation, a reinforced score may correspond to a right answer to a question pre- and post-presentation, and an improved score may correspond to a wrong answer to a question pre-presentation followed by a right answer to a question post-presentation.

Accordingly, in some examples, the Net Meeting Score can be the sum of the NPS, Net Knowledge Score and Net Engagement Score. For example, the Net Meeting score may be a number between −300 and 300.

The reports may also include an engagement timeline 577 that illustrates engagement with a presentation over time.

The key metrics described in relation to FIGS. 5A-5D allow for the aggregation of data not only at the meeting level, but also across meetings, and over time. Additionally, the presentation data may also for the filtering of data at various levels. For example, key metrics can be changed by filtering by other data, such as displaying the percent correct for a specific question split by responses to a demographic question like location, role, and the like. In this way key metrics can be altered to meet the needs of the presenter and can change based on the objectives of the meeting. Metrics can be aggregated, filtered, split, excluded, displayed over time, compared against benchmarks, etc. as well as viewed at a single participant level, slide image level, presentation, etc. Accordingly, systems and methods in accordance with the present disclosure may allow the viewing of data at different levels and groupings.

Embodiments built in accordance with the present disclosure may also include systems configured to intelligently identify areas of improvement and provide suggestions for modifications to existing presentations by utilizing artificial intelligence methods. Such system may be configured to apply artificial intelligence to key metrics, combinations of metrics, and patterns to provide summaries and suggestions for areas of presentation improvement. For example, in some embodiments, natural language processing, sentiment analysis, and topic modeling may be used to review the ratings and reviews for each meeting's evaluations and generate data. Based on the generated data, the system can automatically determine which sessions or areas are underperforming and provide alerts to the client. Additionally, some systems may be used to analyze data across a plurality of meetings in order to identify patterns across meetings such as a specific presenter on a specific topic may be under performing compared to another presenter. For example, such a system may be configured to review the comments across a plurality of meetings, flag "negative" comments and identify that a particular presenter was ineffective because he or she was speaking too fast.

Modifications to the presentation may be based upon reviewing the determined key metrics for each slide. For example, by reviewing the top slides with most actions and/or engagement, a presenter may determine that the slides with the most important content did not resonate with the participants and therefore review and update the indicated slides. In some embodiments, the system may provide a list of slides most likely to require revisions. In another example, a presenter may determine, based on the slide with most questions submitted with it, that more detail is required for a slide. In another example, after reviewing the notes associated with a particular slide, the presenter may determine that the format (i.e., highlight, bolding), or order of content on the slide requires updating.

Modifications to presentations may also be made by reviewing responses to polling questions. For example, if the responses to the polling questions indicate that the participant did not understand the content related to the polling question, the presenter may create new slides, change the existing slides, or the like. Alternatively, the presenter may be presented with contact information for the participant, such that the presenter can follow-up with the participant who asked the question.

Modifications may also be based on the absence of data. For example, slides that elicit no or minimal engagement may be removed, re-ordered or edited as appropriate.

Figure 6:
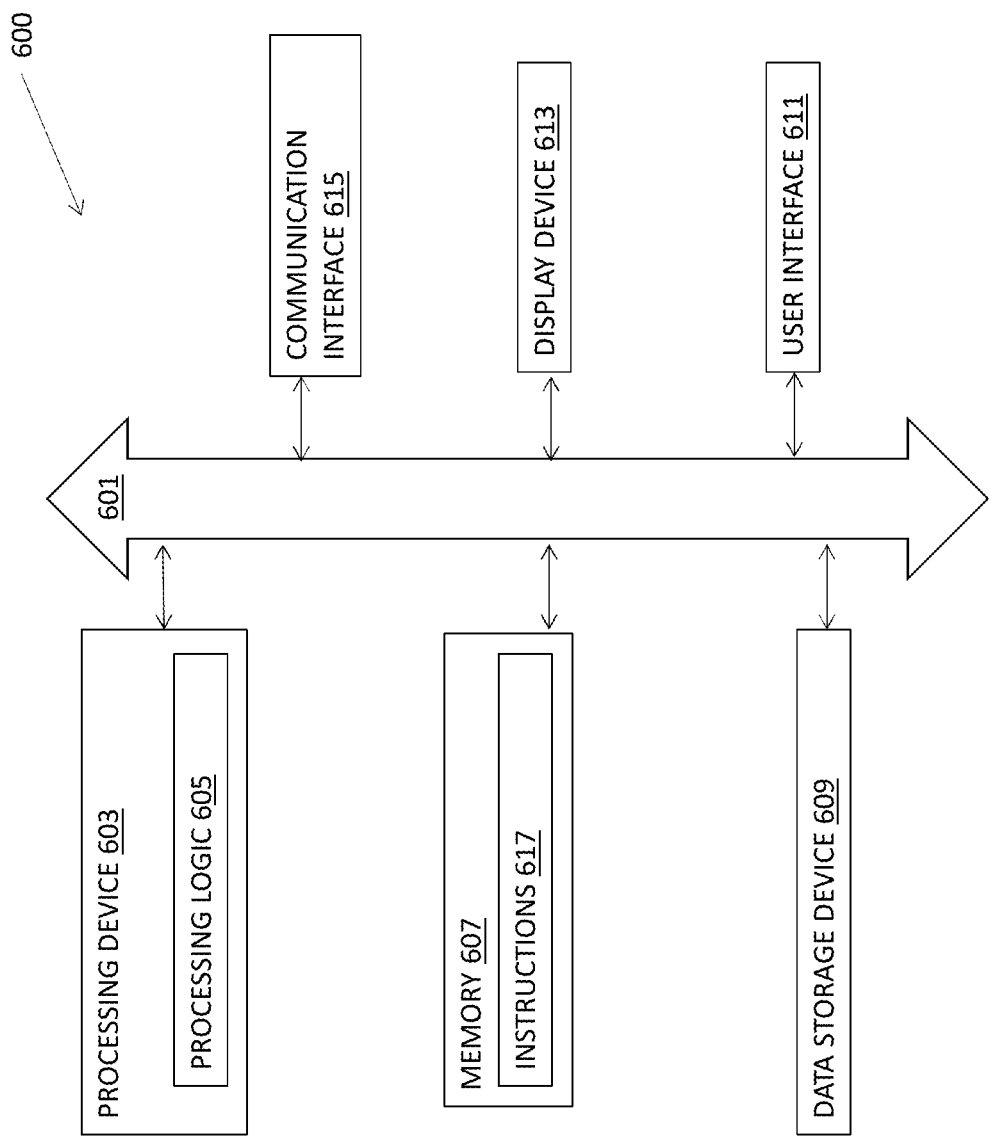
FIG. 6 illustrates a computer system in accordance with some embodiments of the present disclosure.

FIG. 6 illustrates a computer system in accordance with some embodiments of the present disclosure.

FIG. 6 illustrates a functional block diagram of a machine in the example form of computer system 600, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the participant computing device 101, presenter computing device 115 and the server system 105 of FIG. 1 may be implemented by the example machine shown in FIG. 6 (or a combination of two or more of such machines).

Example computer system 600 may include processing device 603, memory 607, data storage device 609 and communication interface 615, which may communicate with each other via data and control bus 601. In some examples, computer system 600 may also include display device 613 and/or user interface 611.

Processing device 603 may include, without being limited to, a microprocessor, a central processing unit, an application specific integrated circuit (ASIC), a field programmable gate array (FPGA), a digital signal processor (DSP) and/or a network processor. Processing device 603 may be configured to execute processing logic 605 for performing the operations described herein. In general, processing device 603 may include any suitable special-purpose processing device specially programmed with processing logic 605 to perform the operations described herein.

Memory 607 may include, for example, without being limited to, at least one of a read-only memory (ROM), a random access memory (RAM), a flash memory, a dynamic RAM (DRAM) and a static RAM (SRAM), storing computer-readable instructions 617 executable by processing device 603. In general, memory 607 may include any suitable non-transitory computer readable storage medium storing computer-readable instructions 617 executable by processing device 603 for performing the operations described herein. Although one memory device 607 is illustrated in FIG. 6, in some examples, computer system 600 may include two or more memory devices (e.g., dynamic memory and static memory).

Computer system 600 may include communication interface device 611, for direct communication with other computers (including wired and/or wireless communication), and/or for communication with network 103 (see FIG. 1). In some examples, computer system 600 may include display device 613 (e.g., a liquid crystal display (LCD), a touch sensitive display, etc.). In some examples, computer system 600 may include user interface 611 (e.g., an alphanumeric input device, a cursor control device, etc.).

In some examples, computer system 600 may include data storage device 609 storing instructions (e.g., software) for performing any one or more of the functions described herein. Data storage device 609 may include any suitable non-transitory computer-readable storage medium, including, without being limited to, solid-state memories, optical media and magnetic media.

In some embodiments, a live meeting technology engagement platform may serve as a hub for users to access a variety of engagement systems to measure the effectiveness of their live meetings. The system may engage audiences through configured software options and then send metrics to a server including an analytics module for analysis purposes.

Figure 7:
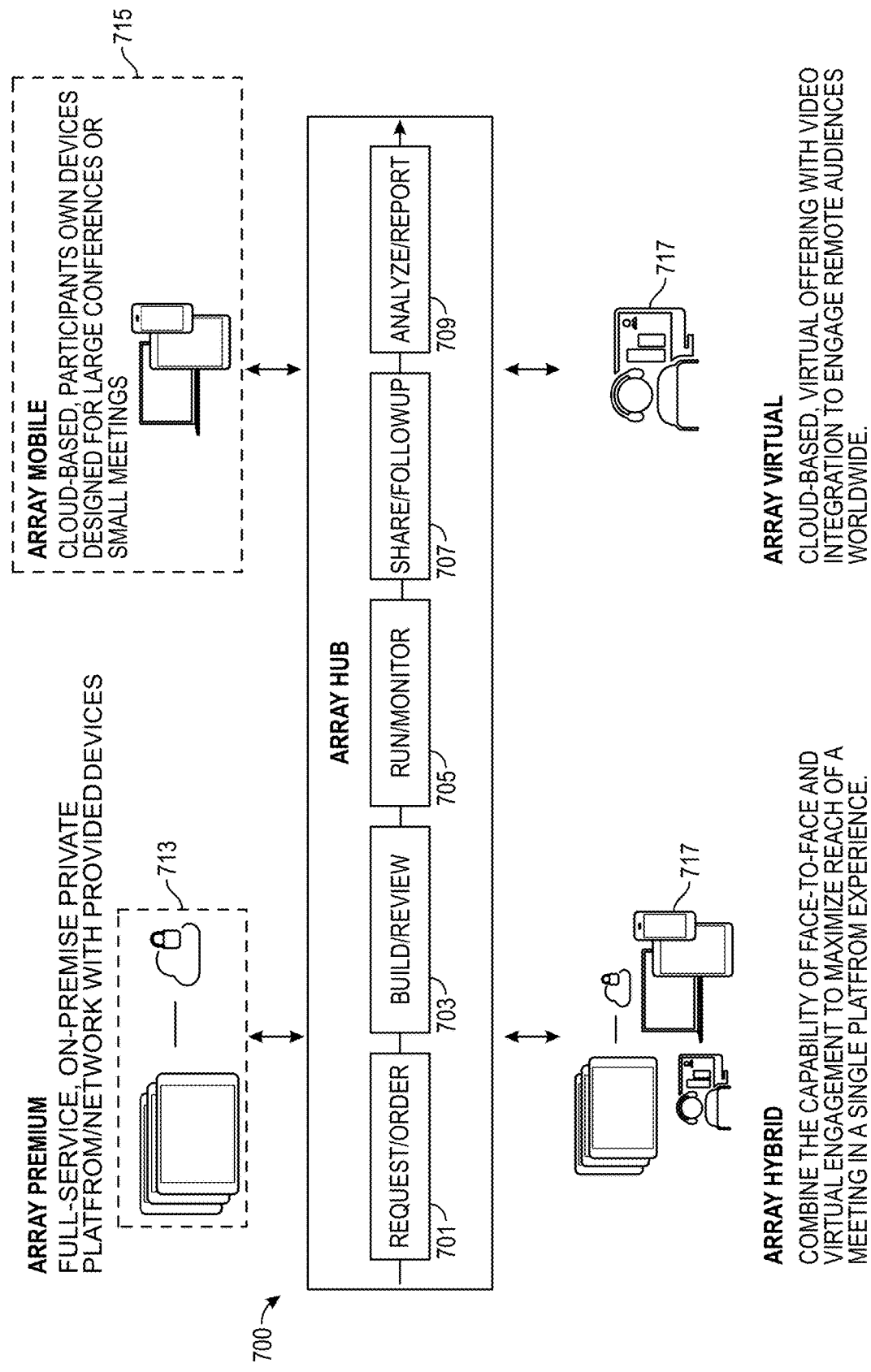
FIG. 7 illustrates a schematic diagram for a platform built in accordance with some embodiments of the present disclosure.

FIG. 7 illustrates a schematic diagram for a platform built in accordance with some embodiments of the present disclosure. As illustrated in FIG. 7, in some embodiments the platform may be configured to be compatible with multiple deployment models. For example, the platform 700 may be configured to allow for the a full-service, private network experience 713 where participants are provided with equipment (e.g., tablet devices, portable computers). Additionally, the platform 700 may also be configured to allow for a cloud-based, fully mobile network experience 715. In the cloud-based experience 715 participants may be able to bring their own devices to connect over the cloud to the platform 700. In some embodiments the cloud-based, fully mobile network experience 715 may be configured for large conferences or small meetings. In some embodiments, the platform 700 may be configured for a hybrid experience 717. The hybrid experience 717 may allow a subset of participants and/or presenters to be present in a live environment, and a second subset of participants and/or presenters may participate in the live meeting virtually, over the internet or the like. In some embodiments, the platform 700 may be configured for a fully virtual experience 719. In such an embodiment, the virtual experience 719 may allow for participants and/or presenters to participate in a live meeting in a remote, or virtual environment. The virtual experience 719 may be a cloud-based system with video integration to allow remote audiences (participants, and presenters) to engage.

The hybrid experience 717 and the virtual experience 719 may allow for the presentation view where participants and presenters may view both a presentation (slides), interact with the presentation (slides) simultaneously as viewing a video stream of presenters, participants, and/or moderators. Participants may be provided the ability to interact with the slides, by taking notes, polling, and other functions for enhanced interactions with the presentation.

In some embodiments, the platform 700 may be integrated with a web-conferencing platform. The web-conferencing platform may allow for video and/or audio integration. Participants, presenters, and/or moderators may be provided with a unique link (in accordance to their role as a participant, presenter, or moderator) that may route them to a separate virtual environment based on their role. Alternatively, participants, presenters and moderators may be provided with unique username/password login information. For example, participants may be routed to an environment where they can view a presentation, take interactive notes/polls and the like with the presentation, participate in a question and answer session, and view a presenter. At the same time presenters may be routed to an environment where they can view a slide deck stored locally, or on the server system, choose which slides to project to the audience, receive and answer questions and the like. Further, moderators may be routed to an environment where they can also moderate incoming questions or comments received from participants and/or presenters, run polls, and take appropriate actions, such as sending links, forwarding questions to presenters, and follow-up emails. Moderators may be used to facilitate presentations, introduce presenters, monitor questions as they are provided, and the like.

In some embodiments, the unique link provided to participants may be used to gather additional data regarding participant experience (how the meeting was perceived), knowledge (how much knowledge was transferred as determined by pre-/post-results of the participants) and engagement (based on percentage of people who are highly engaged/not engaged), and contribute to the determination of a key metric. In embodiments, where each user may be provided with an unique identifying link, the user participants' login and logout times to the presentation may be recorded and provided to the platform. Further, in embodiments where the platform is integrated into a web conferencing platform, the presentation data may be augmented with audio transcript data from the presentation. Additionally, in some embodiments, where the platform is integrated into a web conferencing platform, the presentation may also be augmented with video data from the presentation. Further, chat data between participants, presenters, and/or moderators, may be integrated into the presentation data. The additional unique link data, audio transcript data, video data and the like may be used to identify the pace of the presentation as well as identify how participants engaged with the platform.

Further, in some embodiments, audio transcript data may be used in connection with a sentiment analysis module. The sentiment analysis module may be configured to apply natural language processing to the audio transcript data to determine how participants and presenters feel about the presentation (as a whole, and at individual moments of the presentation). The results from the sentiment analysis module may be integrated into engagement data and/or key metrics. Additionally, in some embodiments, natural language processing may be run on the participant notes as they create notes on slides. In such an embodiment, the natural language processing may be used to generate recommendations for the participant and provide an assisted note-taking. In some embodiments, an artificial intelligence, and/or natural language processing element may help identify recommendations and pre-populate suggestions to users to enable easier note-taking. For example, artificial intelligence and/or natural language processing may be used to pre-load names of drugs, pharmaceuticals, anatomy, and the like, that may enable a user to more quickly populate text notes.

Additionally, interactions between the platform 700 and the participants, presenters and/or moderators by way of whiteboards, notes, highlights, etc. may be used to supplement engagement data.

In some embodiments, the platform 700 may be configured to record any keystrokes, notes, and/or highlights made by a participant on slides during a presentation. Further, the platform 700 may be configured to generate a note or memo based on the participants interactions and provide the participant with a copy of their notes after the presentation is completed.

Participant and/or presenter data may be collected across all deployment modules including the full-service, private network experience 713, cloud-based, fully mobile network experience 715, hybrid experience 717 and fully virtual experience 719. Data related to the deployment type may be used for the further segmentation and categorization of participant data to provide additional metrics to review and improve meeting effectiveness. For example, data may be segmented based on whether a participant participated in a "live" or "virtual" experience. Accordingly, the segmented data may be used to determine if audiences perceived the meeting differently based on whether it was a "live" or "virtual" experience. For example, data may be used to determine if live attendees performed better on knowledge assessment questions, and if certain topics or sessions may be better suited for live experiences instead of virtual experiences based on the determined engagement and knowledge transfer data.

Participant and/or presenter data may be collected across all deployment modules including the full-service, private network experience 713, cloud-based, fully mobile network experience 715, hybrid experience 717 and fully virtual experience 719. In some embodiments, as the hybrid experience 717 may include a private, local environment, the hybrid experience 717 may provide a more secure virtual environment than conventional web conferencing means. In some embodiments, the disclosed networks may be used to support multi-deployment models (fully mobile network experience, hybrid experience, or fully virtual experience) by running on-premise or cloud based private networks that are able to provide stable and secure meetings.

Each of the configurations, may allow a participant to integrate with a platform 700. The platform 700 may include a request/order stage 701, build/review stage 703, run/monitor stage 705, share/followup stage 707, and an analyze/report stage 709. In some embodiments, a meeting organizer, participant, presenter, or moderator may use the platform 700 to designate a particular meeting as face-to-face, mobile, virtual, or a hybrid experience. Accordingly, in such an embodiment, a user may be presented with different options based on their designated deployment model. The designated deployment model may also be used in the segmentation of data and analytics.

The platform 700 may be used by a meeting organizer to create high-engagement meeting experiences. The platform 700 may be embodied in a SaaS environment. The platform may be configured to allow the creation and configuration of new meetings, management of blocks of meetings, uploading of presentations and documents that are to be shared during meetings, communicating with participants of the meetings, creating post-meeting content and the like.

During the request/order stage 701 an organizer may request meetings, and define engagement objectives. For example, a user may request a full-service meeting that is organized by the platform 700. Alternatively, the user may request a block of meetings organized by the platform 700. In some embodiments, the platform 700 may be integrated into a Customer Relationship Management (CRM) system. Accordingly, in such an embodiment, the request/order may be automatically processed, and the appropriate stakeholders can be notified appropriately.

In the build/review stage 703 an organizer may upload assets/slides, chat and/or message with participants and/or presenters, review and edit content of slides, and the like. Uploaded documents may also include slide presentations, resource documents, survey questions, and the like. Further, during the build/review stage 703, an organizer may be able to communicate with a service provider associated with the platform 700 to streamline communication.

In the run/monitor stage 705 an organizer may download and/or synchronize a presentation to a server system and monitor live meeting metrics. During the run/monitor stage 705 the platform 700 may be configured to process and/or store the presentation data and the participant data in the relevant database.

For example, in some embodiments, an organizer may monitor the number of participants logged in, the number of live connections, counts of all the engagement metrics (number of slides saved, presenter questions, etc.), responses to polls the participants are submitting, the time spent on a slide, time since the last engagement action, the number of slides left in deck, and the like in real time. These monitored factors may also be monitored offline, or data for the monitored factors may be stored and retrieved while offline.

In the share/follow-up stage 707 an organizer may email participant notes and resources, send certificates and follow-up surveys. This may include the generation of automated emails to participants. In some embodiments, the emails may include participant notes and saved content from the meeting as well as targeted communication based on how participants engaged within the meeting. In the analyze/report stage 709 an organizer may provide data analytics and trends. In some embodiments, these may include the reports discussed above.

In some embodiments, when the platform 700 is integrated into a virtual 719 or hybrid environment 717, presenters and participants may be joined by a moderator. The platform 700 may be integrated into a graphical user interface provided by a webpage, application and the like that the participants, presenters and/or moderators may access.

Figure 8:
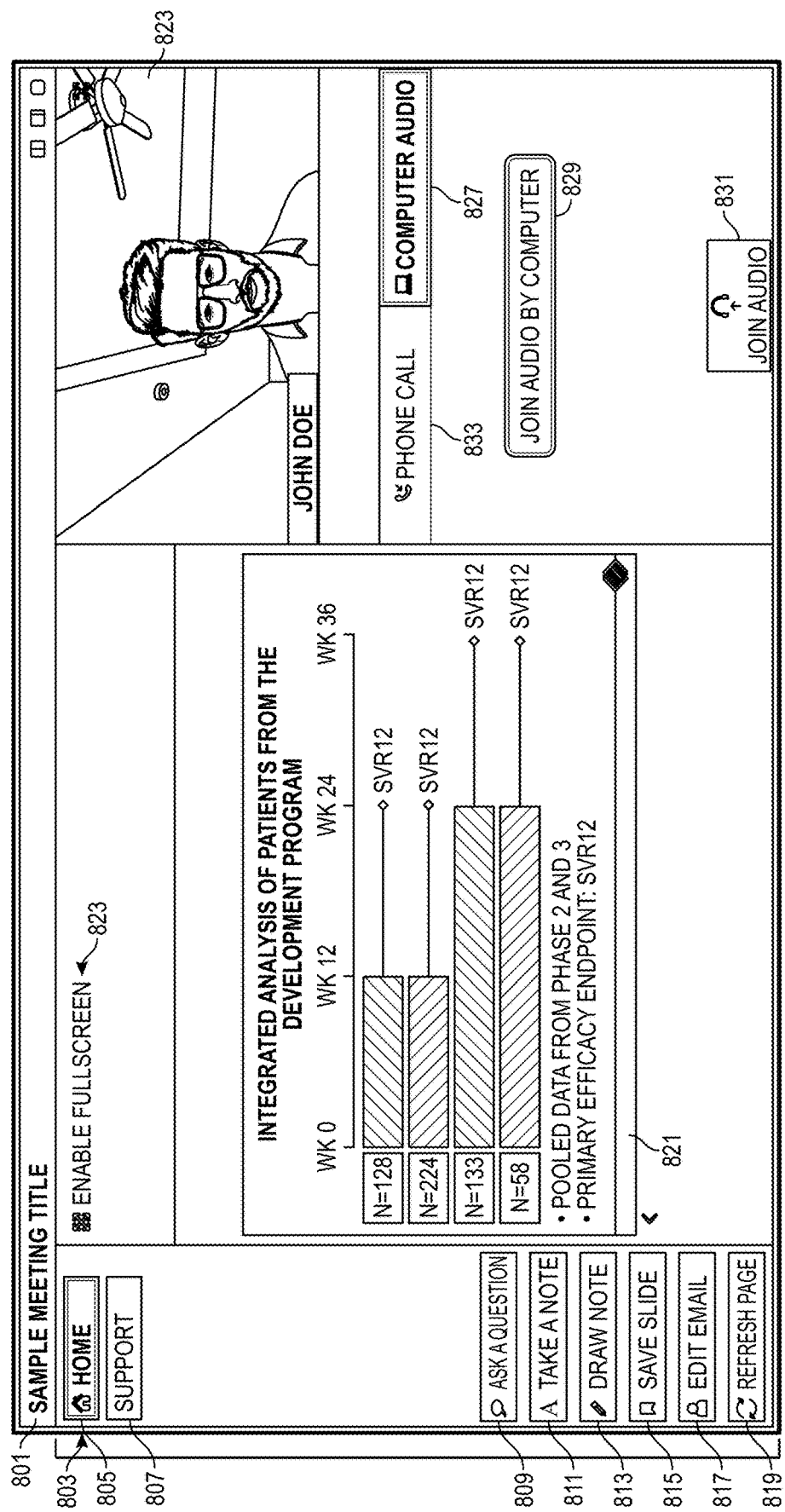
FIG. 8 illustrates a view of a platform built in accordance with some embodiments of the present disclosure.

FIG. 8 illustrates a view of a platform built in accordance with some embodiments of the present disclosure. In particular, FIG. 8 illustrates a participant view. As illustrated in FIG. 8, the participant view may include an interface where slides or a presentation 821 are displayed. In some embodiments, the platform may be integrated with a videoconferencing service that allows for video integration 825 (i.e., displays a presenter), and audio integration 831 by way of a cell phone or similar device 833, and/or computer audio 827, 829. The participant may be given the option to view the presentation in a full screen mode 823 and resize various portions of the participant view. Using the menu 803 the participant may view presentations that they have access to using the home icon 805. The participants may be provided with technical support 807. The technical support 807 function enables a participant to access dedicated technical support to help with connection issues, functionality inquiries, and the like.

The home menu 803 may include options that are configured to allow a participant to interact with the presentation including the ability to ask a question 809, take a note 811, draw a note 813, save a slide 815, edit an email 817, and refresh a page 819. In some embodiments, the questions 809 may be saved and stored as a part of presentation data, the questions 809 may also be provided to a presenter and/or moderator for review and answer. The questions 809 may include a pop-up graphical user interface, where a participant can type in a question or chat. Alternatively, the questions 809 may include the ability to enter a question by audio such as voice to text, or simply voice. The participant may also have the ability to add a notation to a slide by typing a note 811 by way of a keyboard or by drawing a note 813 by way of a mouse, or stylus, or the like. The notations may be saved and correlated with each slide, using the save slide 815 feature. In some embodiments, the participant may be able to email themselves a copy of the edited slide deck (with saved notes) using the edit email feature 817. In some embodiments, participants may receive their notes and saved markups through an automatic email distribution system which emails those participating in the platform who are registered with their email address. The edit email feature 817 allows the participant to update the email address the slides or notes will be sent to. In some embodiments, the platform may automatically generate a document including slides and/or saved notes from the presentation. The document may be stored in a centralized database that is accessible to the user by their login. Alternatively, the document may be automatically emailed to the user after the presentation has concluded. In some embodiments, the participant may use the refresh page 819 option to reload a slide. Further the refresh page 819 option may enable a user to refresh the interface to ensure that they are synchronized with the content and have the latest assets. This may be used in the event of a network connection issue.

Figure 9:
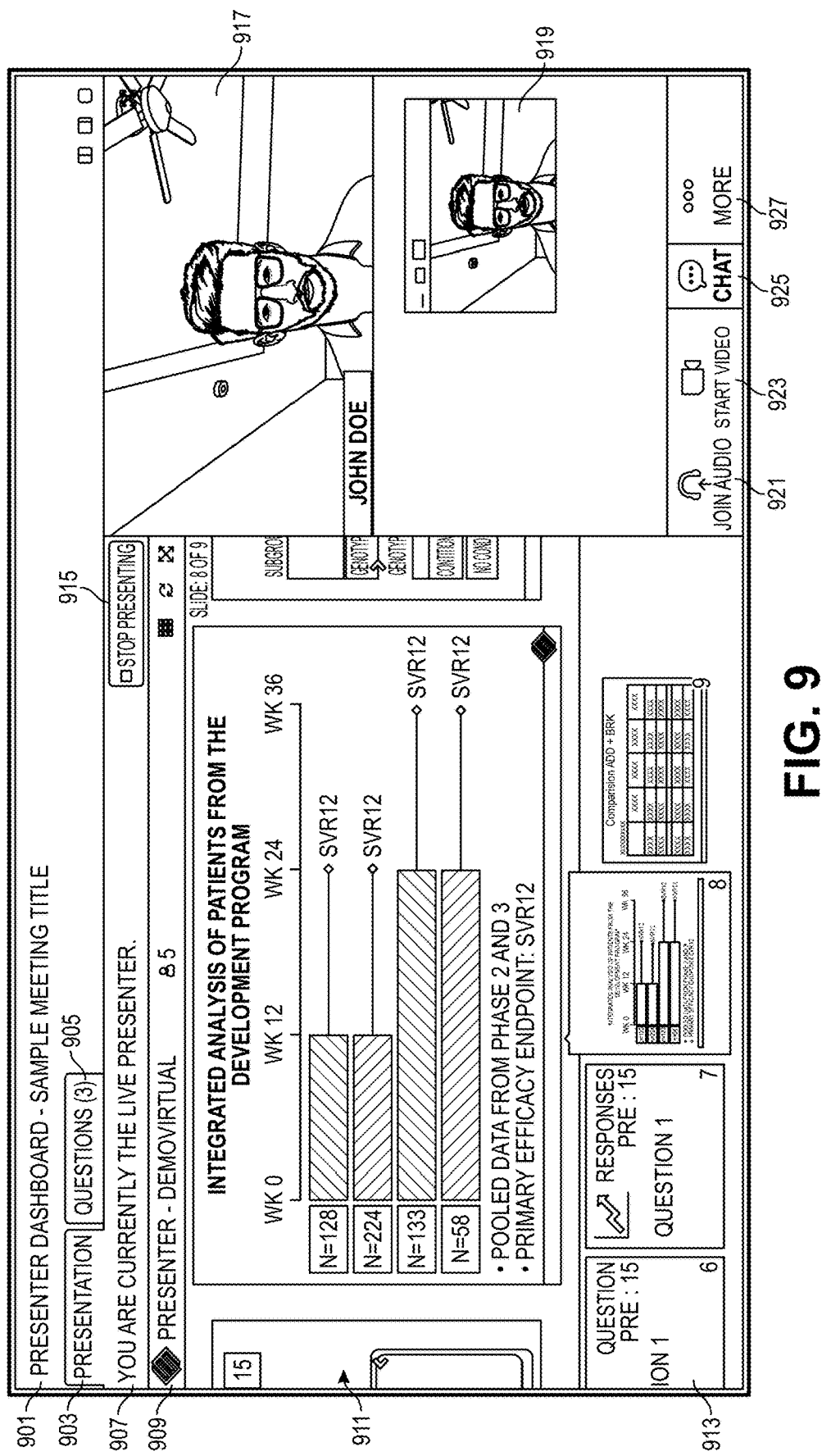
FIG. 9 illustrates a second view of a platform built in accordance with some embodiments of the present disclosure.

FIG. 9 illustrates a second view of a platform built in accordance with some embodiments of the present disclosure. In particular, FIG. 9 illustrates a graphical user interface with a presenter view. The presenter view may be configured to display the meeting title to the presenter 901. The presentation 903 may be in one window, and questions 905 may be displayed in a second window. The presenter may have the option of toggling between the presentation window 903 and the questions window 905. In some embodiments, an indication regarding the presentation status may be provided to the presenter 907. For example, the presenter may be actively presenting (i.e., "You are currently the live presenter"), in a dormant state ("You are currently in follow mode."), or the like. The presentation window 903 may include a general presentation overview 909 which displays the participants, allows the presenter to view participants or slides in different formations. The presenter window 903 may also display the slides 911 of the presentation. The presenter may have the option of clicking on one or more slides from a slide deck 913 and casting them to participants as a part of the presentation. The presenter window 903 may also provide the presenter with the option to stop presenting 915. The presenter view may include a panel to display the current presenter's video 917. The presenter may also view their individual video feed 919, have the ability to integrate audio 921, video 923, share their screen, and the like 927. The presenters also have the ability to chat 925 amongst other presenters, presenters and moderators, or with participants. In some embodiments, where there are multiple presenters, the presenters may effectively be in a shared "presenter" space with this view. The multiple presenters will have the ability to collectively see the slide presentations update in real-time, view and manage questions as they're submitted, chat with each other and see and hear each other.

Figure 10:
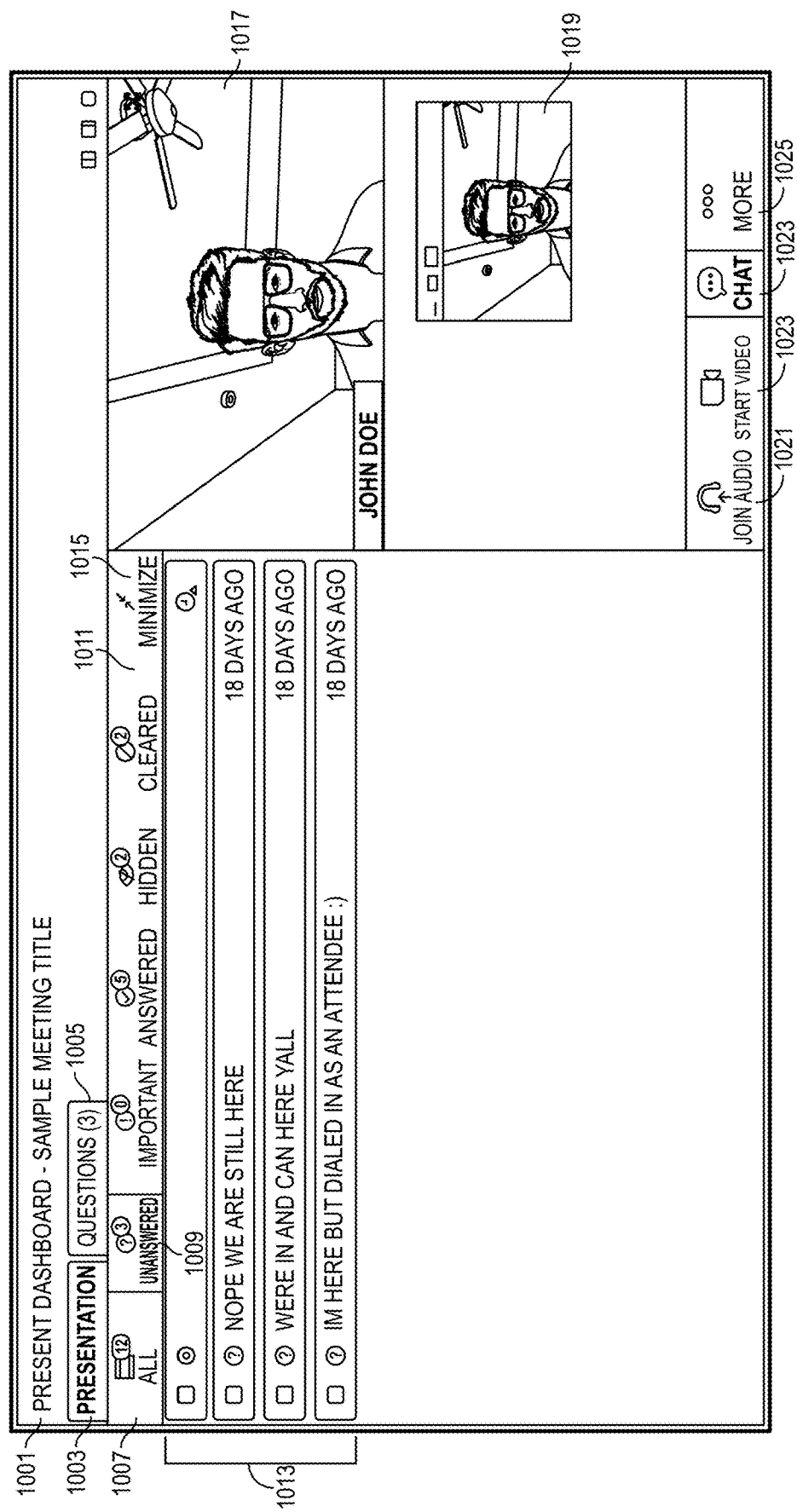
FIG. 10 illustrates a third view of a platform built in accordance with some embodiments of the present disclosure.

FIG. 10 illustrates a third view of a platform built in accordance with some embodiments of the present disclosure. In particular, FIG. 10 illustrates a moderator view. A moderator may be configured to view requests and input from participants, greet participants, assist presenters with their presentations and the like. The moderator view may include a description of the meeting title 1001. The moderator view may also include a presentation tab 1003, where the moderator may be able to view the presentation live. The moderator view may also include a questions tab 1005. The questions tab 1005 may allow a moderator to view communications 1013 from presenters and/or participants. The questions tab 1005 may allow a moderator to view all questions 1007, unanswered questions 1009, important, answered, hidden, and cleared questions 1011. The question tab may also be minimized 1015. In the moderator view, the presenter may be viewed 1017. In the moderator view, the moderator can also view an image of their video feed 1019. The moderator's audio 1021 and video 1023 capabilities may also be integrated into the web conferencing platform. The moderator may participate in a chat 1023 with other moderators, presenters, and/or participants. Additional function 1025 include the ability to disconnect from the meeting and the like.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, soft ware, Software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, much of this document has been described with respect to television advertisements, but other forms of future, viewership-based advertisements may also be addressed. Such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. A system comprising:
   a presenter computing device configured to generate a first presentation for a meeting environment mediated by an electronic platform, wherein the first presentation comprises electronically delivered content;
   participant computing devices configured to display the electronically delivered content of the first presentation and generate participant data comprising one or more participant reactions to the electronically delivered content of the first presentation; and a server system comprising one or more processors and a memory that includes instructions, that when executed by the one or more processors, causes the one or more processors to:
initiate a hybrid presentation session corresponding to the first presentation, wherein the hybrid presentation session simultaneously enables:
a first subset of the participant computing devices, physically remote from the presenter computing device, to access a first set of separate role specific virtual environments to receive the first presentation, wherein participant data associated with a first deployment data type is collected from the first subset of the participant computing devices accessing the first set of separate role specific virtual environments; and
a second subset of the participant computing devices, physically proximate to the presenter computing device, to access a second set of separate role specific virtual environments to receive the first presentation, wherein participant data associated with a second deployment data type is collected from the second subset of the participant computing devices accessing the second set of separate role specific virtual environments;
receive the first presentation for the meeting environment including the electronically delivered content and presentation data from the presenter computing device or a moderator computing device on the electronic platform;
display on the first subset and the second subset of the participant computing devices, via the first set and the second set of separate role specific virtual environments, the first presentation;
receive, at the server system, from the first subset and the second subset of the participant computing devices, the first deployment data type and the second deployment data type respectively, and the participant data indicative of participant computing device activity within the first set and the second set of separate role specific virtual environments;
determine an engagement delta metric for a key metric, by the server system, by segmenting the participant data according to the first deployment data type and the second deployment data type, wherein:
the engagement delta metric indicates at least a difference in engagement between the first subset and the second subset of the participant computing devices with the first presentation; and
the key metric is comprised of at least the engagement delta metric; and
modify a second presentation of the electronic platform based on the key metric by altering electronic content of the second presentation of the electronic platform.

2. The system of claim 1 wherein the participant data comprises at least one of participant engagement data, participant feedback, and participant login timing data.

3. The system of claim 1, wherein the presentation data comprises at least one of slides associated with the first presentation, timing information for when each slide is displayed to a participant, polling questions, chat data, audio transcripts from the first presentation, and video transcripts from the first presentation.

4. The system of claim 1, wherein the key metric is further comprised of at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles.

5. The system of claim 4, wherein a participant profile comprises at least one of a participant demographic, an indication of the content a participant responded to, the percentage of questions the participant answered correctly, or a unique participant link.

6. The system of claim 1, wherein the modification to the electronic content of the second presentation comprises altering at least one of slide formatting, slide order, slide content, presentation order, and presentation content.

7. The system of claim 1, wherein the server system is configured to integrate with a videoconferencing software to provide a user interface on one of the participant computing devices, the presenter computing device, and the moderator computing device to display the first presentation, and engage with the first presentation.

8. The system of claim 1, further comprising:
a private network configured to communicatively interface at least one of the participant computing devices, the moderator computing device, and the presenter computing device.

9. The system of claim 1, wherein the moderator computing device is configured to:
receive participant inquiries from one or more of the participant computing devices;
determine and provide a subset of the participant inquiries for presenter input;
receive presenter input on the subset of participant inquiries; and
provide the presenter input to the participant computing devices for display.

10. The system of claim 1, wherein at least presenter computing devices and moderator computing devices are located in physical proximity.

11. The system of claim 1, wherein at least presenter computing devices and moderator computing devices are remote from each other.

12. A method comprising:
initiating a hybrid presentation session corresponding to a first presentation, wherein the hybrid presentation session simultaneously enables:
a first subset of participant computing devices, physically remote from a presenter computing device, to access a first set of separate role specific virtual environments to receive the first presentation, wherein participant data associated with a first deployment data type is collected from the first subset of the participant computing devices accessing the first set of separate role specific virtual environments; and
a second subset of participant computing devices, physically proximate to the presenter computing device, to access a second set of separate role specific virtual environments to receive the first presentation, wherein participant data associated with a second deployment data type is collected from the second subset of the participant computing devices accessing the second set of separate role specific virtual environments;

receiving, at a server system, presentation data from at least one of a presenter computing device or a moderator computing device communicatively coupled to an electronic platform associated with the first presentation, wherein the presentation data corresponds to the first presentation including electronically delivered content;

receiving, at the server system, from the first subset and the second subset of the participant computing devices, the first deployment data type and the second deployment data type respectively, and the participant data indicative of at least participant computing device activity within the first set and the second set of second separate role specific virtual environments;

determining an engagement delta metric for a key metric, by the server system, by segmenting the participant data according to the first deployment data type and the second deployment data type, wherein:

the engagement delta metric indicates at least a difference in engagement between the first subset and the second subset of the participant computing devices with the first presentation; and the key metric is comprised of at least the engagement delta metric; and modifying, by the server system, a second presentation of the electronic platform based on the key metric by altering electronic content of the second presentation of the electronic platform.

13. The method of claim 12, wherein the participant data comprises at least one of participant engagement data, participant feedback, and participant login timing data.

14. The method of claim 12, wherein the presentation data comprises at least one of slides associated with the first presentation, timing information for when each slide is displayed to a participant, polling questions, chat data, audio transcripts from the first presentation, and video transcripts from the first presentation.

15. The method of claim 12, wherein the key metric is further comprised of at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles.

16. The method of claim 15, wherein a participant profile comprises at least one of a participant demographic, an indication of the content a participant responded to, or the percentage of questions the participant answered correctly, or a unique participant link.

17. The method of claim 12, wherein generating recommendations for modifying the second presentation comprises altering at least one of slide formatting, slide order, slide content, presentation order, and presentation content.

18. The method of claim 12, wherein determining one or more key metrics for the first presentation comprises determining one or more key metrics for a particular slide, determining one or more key metrics across a collection of slides, and comparing at least one of the key metric for a particular slide, and key metrics for across a collection of slides, with a benchmark.

19. The method of claim 12, further comprising:

receiving participant inquiries from one or more of the participant computing devices;

determining and providing a subset of the participant inquiries for presenter input;

receiving presenter input on the subset of participant inquiries; and providing the presenter input to the first subset and the second subset of participant computing devices for display.

20. The method of claim 12, wherein at least one of the moderator computing device and the presenter computing device is communicatively coupled over a private network.

* * * * *